US012602077B2

(12) United States Patent　　　(10) Patent No.:　US 12,602,077 B2

Lee　　　(45) Date of Patent:　Apr. 14, 2026

(54) DISPLAY APPARATUS

(71) Applicant: LG Display Co., Ltd., Seoul (KR)

(72) Inventor: ShinSuk Lee, Gimpo-si (KR)

(73) Assignee: LG DISPLAY CO., LTD., Seoul (KR)

( * ) Notice: Subject to any disclaimer, the term of this patent is extended or adjusted under 35 U.S.C. 154(b) by 183 days.

(21) Appl. No.: 18/371,324

(22) Filed: Sep. 21, 2023

(65) Prior Publication Data

US 2024/0176390 A1　　　May 30, 2024

(30) Foreign Application Priority Data

Nov. 30, 2022　　(KR) ......................... 10-2022-0165152

(51) Int. Cl.
*G06F 1/16*　　　　(2006.01)
(52) U.S. Cl.
CPC .......... *G06F 1/1624* (2013.01); *G06F 1/1626* (2013.01); *G06F 1/1652* (2013.01)
(58) Field of Classification Search
CPC .... G06F 1/1624; G06F 1/1626; G06F 1/1652; H10K 77/111; H10K 59/12; H10K 59/40; H10K 50/84; H10K 2102/311; G09F 9/301; H04M 1/0237; H04M 1/0268
See application file for complete search history.

(56) References Cited

U.S. PATENT DOCUMENTS

| | | | |
|---|---|---|---|
| 10,203,531 B2 * | 2/2019 | Choi ................. | G02F 1/133305 |
| 10,345,856 B2 * | 7/2019 | Song ..................... | H05K 1/028 |
| 10,368,452 B2 * | 7/2019 | Yun ......................... | G09F 9/301 |
| 10,674,617 B2 * | 6/2020 | Lin ........................... | B32B 7/14 |
| 10,684,714 B2 * | 6/2020 | Seo ........................ | G06F 1/3262 |
| 10,694,623 B2 * | 6/2020 | Park ........................ | G09F 9/301 |
| 10,820,433 B2 * | 10/2020 | Cha ....................... | H05K 5/0226 |
| 10,838,458 B1 * | 11/2020 | Park ..................... | G06F 1/1641 |
| 11,102,339 B2 * | 8/2021 | Ahn ........................ | G09F 9/301 |
| 11,191,172 B2 * | 11/2021 | Sasaki .................... | G06F 1/1652 |
| 11,474,570 B2 * | 10/2022 | Lee ....................... | G06F 1/1652 |
| 11,481,002 B2 * | 10/2022 | Park .................... | H04M 1/0216 |
| 11,513,415 B2 * | 11/2022 | Hashimoto ........... | G06F 1/1652 |
| 11,543,859 B2 * | 1/2023 | Kwak ................. | H04M 1/0237 |
| 11,550,358 B2 * | 1/2023 | Cheng ................... | H04M 1/022 |
| 11,726,527 B2 * | 8/2023 | Seo ........................ | G06F 1/1643 |
| | | | 361/679.01 |

(Continued)

FOREIGN PATENT DOCUMENTS

KR　　10-2022-0091330 A　　6/2022

*Primary Examiner* — Rockshana D Chowdhury
(74) *Attorney, Agent, or Firm* — Birch, Stewart, Kolasch & Birch, LLP

(57)　　　　ABSTRACT

A display apparatus can include a first frame, a second frame, and a third frame forming an outer periphery, and a flexible display unit including a first area coupled to the first frame, a second area coupled to the third frame, and a third area located between the first area and the second area. The flexible display unit can include a display panel, a first member on a rear surface of the display panel, and a second member between the display panel and the first member. The flexible display unit can implement a first state by moving the first frame in a first direction with respect to the second frame, or can implement a second state by moving the first frame in a second direction being different from the first direction.

19 Claims, 29 Drawing Sheets

(56)　　　　　References Cited

U.S. PATENT DOCUMENTS

| | | | | |
|---|---|---|---|---|
| 11,793,061 B2 * | 10/2023 | Cai | B32B 3/14 |
| | | | 361/807 |
| 11,810,482 B2 * | 11/2023 | Wu | G06F 1/1635 |
| 11,860,694 B2 * | 1/2024 | Shin | G06F 1/1637 |
| 11,934,227 B2 * | 3/2024 | Kim | G06F 1/1641 |
| 11,950,379 B2 * | 4/2024 | Kim | H04M 1/0216 |
| 11,963,319 B2 * | 4/2024 | Min | H05K 5/0217 |
| 12,169,424 B2 * | 12/2024 | Shin | H01Q 1/44 |
| 12,253,881 B2 * | 3/2025 | Kim | G06F 1/1656 |
| 12,265,421 B2 * | 4/2025 | Lee | G09F 9/301 |
| 12,277,009 B2 * | 4/2025 | Jang | G06F 1/1652 |
| 12,277,876 B2 * | 4/2025 | Lee | G02F 1/133308 |
| 12,292,761 B2 * | 5/2025 | Zhang | G06F 1/1618 |
| 2018/0103552 A1 * | 4/2018 | Seo | G09F 9/301 |
| 2018/0190936 A1 * | 7/2018 | Lee | B32B 15/04 |
| 2018/0192527 A1 * | 7/2018 | Yun | G06F 1/1681 |
| 2019/0064881 A1 * | 2/2019 | Kim | G06F 1/1652 |
| 2021/0118337 A1 * | 4/2021 | Park | G09F 9/301 |
| 2021/0168929 A1 * | 6/2021 | Wang | H05K 1/028 |
| 2021/0311525 A1 * | 10/2021 | Seo | H04M 1/0216 |
| 2022/0019261 A1 * | 1/2022 | Kang | G06F 1/1658 |
| 2022/0039274 A1 * | 2/2022 | Shin | G06F 1/162 |
| 2022/0058991 A1 * | 2/2022 | Lee | G09F 9/301 |
| 2022/0061168 A1 * | 2/2022 | Shin | H05K 5/0217 |
| 2022/0130287 A1 * | 4/2022 | Feng | G06F 1/1624 |
| 2022/0171434 A1 * | 6/2022 | Park | G06F 1/1698 |
| 2022/0217228 A1 * | 7/2022 | Hu | G06F 1/1652 |
| 2022/0342448 A1 * | 10/2022 | Shin | G06F 1/1624 |
| 2022/0404877 A1 * | 12/2022 | Sakamoto | G06F 1/1643 |
| 2023/0010760 A1 * | 1/2023 | Lee | G06F 1/1643 |
| 2023/0017674 A1 * | 1/2023 | Kim | G06F 1/1641 |
| 2023/0050666 A1 * | 2/2023 | Li | G06F 1/1637 |
| 2023/0089831 A1 * | 3/2023 | Li | G06F 1/1601 |
| | | | 361/679.01 |
| 2023/0124270 A1 * | 4/2023 | Ko | G05B 15/02 |
| | | | 700/275 |
| 2023/0156105 A1 * | 5/2023 | Feng | H04M 1/0268 |
| | | | 361/679.01 |
| 2023/0213976 A1 * | 7/2023 | Lee | H10K 71/50 |
| 2023/0252915 A1 * | 8/2023 | Han | G09F 9/30 |
| | | | 361/679.01 |
| 2024/0045471 A1 * | 2/2024 | Wang | G06F 1/1652 |
| 2024/0176390 A1 * | 5/2024 | Lee | G06F 1/1652 |

* cited by examiner 1270  1600  1550a

1410

1550c

1220b

1610

1230

1410

1600

DISPLAY APPARATUS

CROSS-REFERENCE TO RELATED APPLICATIONS

This application claims priority to Korean Patent Application No. 10-2022-0165152 filed on Nov. 30, 2022 in the Republic of Korea, the entire contents of which are hereby expressly incorporated by reference into the present application.

BACKGROUND

Field

The present disclosure relates to a display apparatus.

Discussion of the Related Art

Recently, portable terminals such as a wireless terminal, a personal digital assistant (PDA), a portable multimedia player (PMP), or an electronic notebook are being miniaturized to ensure portability. However, since a user wants to receive various information such as text information, videos, still images, MP3, or games through a screen of the portable terminal, the user demands a large-sized and a wide-sized screen for the display unit. However, for the purpose of the miniaturization of the portable terminal, a size of a screen of the display unit needs to be reduced and as a result, there can be a limitation in satisfying both needs for miniaturization and expansion of the display screen.

In order to address the above-mentioned limitations, a flexible display apparatus such as a bendably display apparatus, a foldable display apparatus, or a roll-slide display apparatus is being developed.

The flexible display apparatus can be implemented by configuring or forming a display substrate with a plastic material. The flexible display apparatus can be easily carried and implemented as a large screen. As such, the flexible display apparatus can be applied to various fields including not only mobile equipment such as a mobile phone, an electronic book, or electronic newspaper, but also a television or a monitor.

Recently, a flexible display with a sufficient elasticity to allow for significant deformation has been developed. Such a flexible display can be deformed to be rollable.

A roll-slide display apparatus can protrude the flexible display to the outside of the body with a desired size while accommodating the rolled flexible display. Accordingly, the flexible display is used so that the roll-slide display apparatus can have a more compact structure.

SUMMARY OF THE DISCLOSURE

In order to use a roll-slide display apparatus, the display can be withdrawn from the body and as soon as it is withdrawn, the display can be expanded with a size desired by the user. However, the inventor of the present disclosure recognized that when the roll-slide display apparatus was changed from a default state to an expanded state, the deformation recovery of the bent display panel was delayed, which can cause loosening or creases. The inventor of the present disclosure recognized that a rigid structure, such as a plate and a rolling belt, was applied to alleviate the occurrence of creases, but additional deformation restoration force was needed to further reduce the occurrence of creases.

Therefore, the inventor of the present disclosure invented a roll-slide display apparatus with a new structure. An object to be achieved by the present disclosure is to provide a roll-slide display apparatus which alleviates or addresses the loosening or creases of a bending unit of the display panel of the display while minimizing a cost and a process.

Another object of the present disclosure is to provide a display apparatus which can address the limitations and disadvantages associated with the related art.

Objects of the present disclosure are not limited to the above-mentioned objects, and other objects, which are not mentioned above, can be clearly understood by those skilled in the art from the following descriptions.

According to an aspect of the present disclosure, a display apparatus includes a first frame, a second frame, and a third frame configuring an outer periphery; and a flexible display unit including a first area coupled to the first frame, a second area coupled to the third frame, and a third area located between the first area and the second area. The flexible display unit includes a display panel, a first member on a rear surface of the display panel; and a second member between the display panel and the first member. The flexible display unit implements a first state by moving the first frame in a first direction with respect to the second frame or implements a second state by moving the first frame in a second direction which is different from the first direction.

According to another aspect of the present disclosure, a display apparatus includes a display panel displaying an image; a first member on a rear surface of the display panel and having a groove portion in which a top surface partially removed in one direction; a second member between the display panel and the first member; and a third member in a groove portion.

According to the exemplary embodiment of the present disclosure, when the display apparatus is changed from a default state into an expanding state, the loosening, or creases of the bending unit of the display panel are alleviated to ensure the durability and improve the driving or operating failure of the display apparatus.

According to the exemplary embodiment of the present disclosure, the flexibility, and the rigidity of the display panel of the display apparatus can be simultaneously ensured and a simple structure can be implemented, and a cost can be reduced.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1:
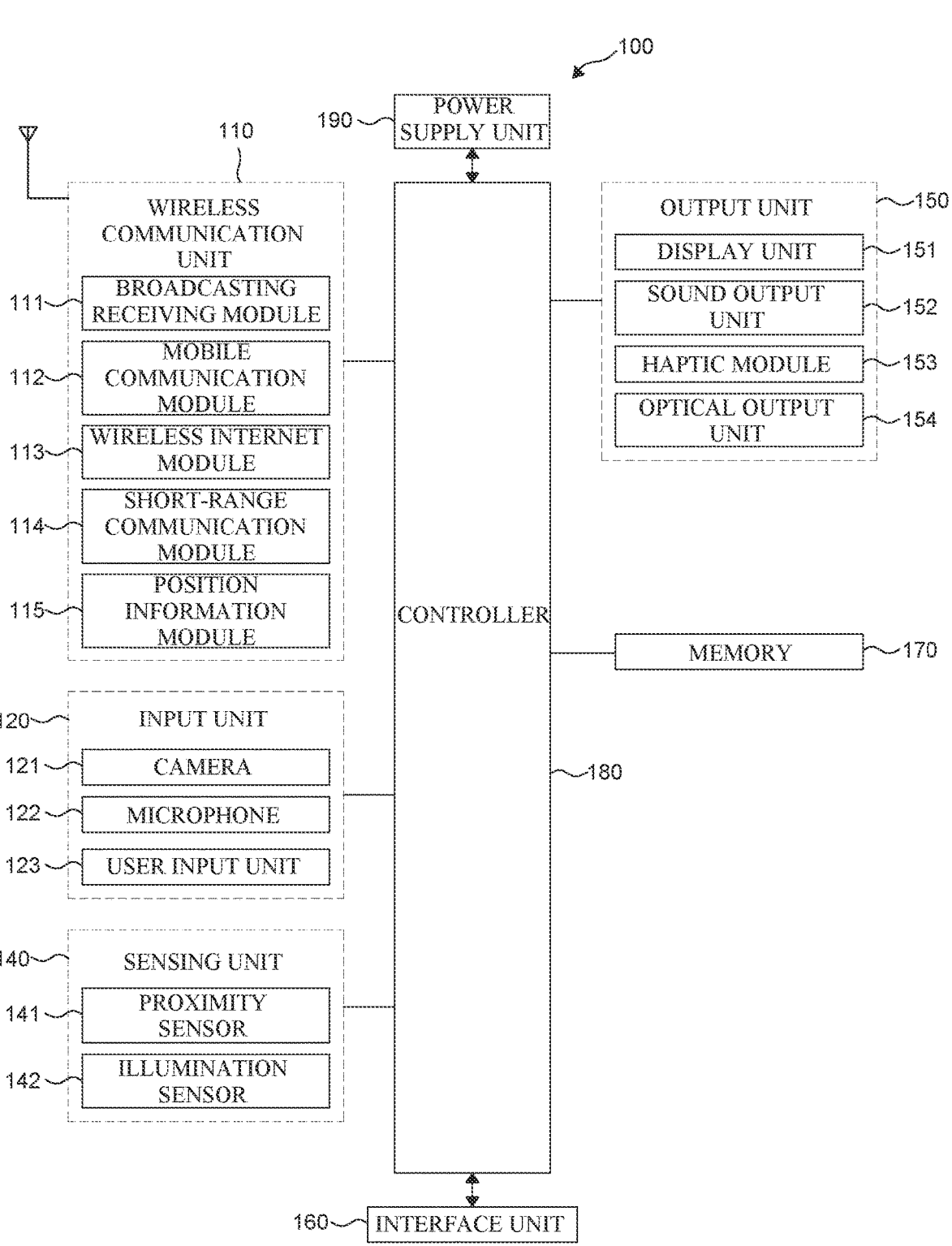
FIG. 1 is a block diagram illustrating a display apparatus according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted or may be provided briefly to avoid unnecessarily obscuring the subject matter of the present disclosure. The terms such as "including," "having," "comprising," etc. used herein are generally intended to allow other components to be added unless the terms are used with the term "only". Any references to singular can include plural unless expressly stated otherwise.

In construing an element, the element is construed as including an error range although there is no explicit description.

In describing a position relationship, for example, when a position relation between two parts is described as "on," "over," "under," and "next", one or more other parts can be disposed between the two parts unless "just(ly)" or- "direct (ly)" is used.

In describing a time relationship, for example, when the temporal order is described as 'after~', 'subsequent~', 'next~', and 'before~', a case which is not continuous can be included unless "just(ly)" or "direct(ly)" is used.

It will be understood that, although the terms "first," "second," etc. can be used herein to describe various elements, these elements should not be limited by these terms. These terms are only used to distinguish one element from another, and may not define order or sequence. For example, a first element could be termed a second element, and, similarly, a second element could be termed a first element, without departing from the scope of the present disclosure.

Features of various embodiments of the present disclosure can be partially or overall coupled to or combined with each other, and can be variously inter-operated with each other and driven technically. Embodiments of the present disclosure can be carried out independently from each other, or can be carried out together in co-dependent relationship.

In the present disclosure, examples of a display device can include a narrow-sense display device such as a quantum dot (QD) module, an organic light emitting diode (OLED) module or a liquid crystal module (LCM) having a display panel and a driver for driving the display panel. Further, examples of the display device can include a set device (or a set apparatus) or a set electronic apparatus such as a notebook computer, a TV, a computer monitor, an equipment apparatus including an automotive apparatus or another type of apparatus for vehicles, or a mobile electronic device such as a smartphone or an electronic pad, which is a complete product (or a final product) including an LCM, an OLED module, and a QD module.

Therefore, in the present disclosure, examples of the display device can include a narrow-sense display device itself, such as an LCM, an OLED module, and a QD module, and a set device, which is a final consumer device or an application product including the LCM, the OLED module, and the QD module.

In some embodiments, an LCM, an OLED module, and a QD module including a display panel and a driver can be referred to as a narrow-sense display device, and an electronic device, which is a final product including an LCM, an OLED module, and a QD module can be referred to as a set device. For example, the narrow-sense display device can include a display panel, such an LCM, an OLED module, or a QD module, and a source printed circuit board (PCB), which is a controller for driving the display panel. The set device can further include a set PCB, which is a set controller electrically connected to the source PCB to overall control the set device.

A display panel applied to embodiments of the present disclosure can use any type of display panel, including a liquid crystal display panel, an organic light emitting diode (OLED) display panel, a quantum dot (QD) display panel, and an electroluminescent display panel. The display panel of the embodiment is not limited to a specific display panel capable of bezel bending with a flexible substrate for an organic light emitting diode (OLED) display panel and a lower back plate support structure. Further, a shape or a size of a display panel applied to a display device according to these embodiments is not limited.

In an example where the display panel is the organic light emitting display panel, the display panel can include a plurality of gate lines, data lines, and pixels respectively provided in intersections of the gate lines and the data lines. Further, the display panel can include an array including a thin film transistor (TFT), which is an element for selectively applying a voltage to each of the pixels, a light emitting element layer on the array, and an encapsulation substrate or an encapsulation layer disposed on the array to cover the light emitting element layer. The encapsulation substrate can protect the TFT and the light emitting element layer from an external impact and can prevent water or oxygen from penetrating into the light emitting element layer. Further, a layer provided on the array can include an inorganic light emitting layer, for example, a nano-sized material layer, a quantum dot, or the like.

Hereinafter, an exemplary embodiment of a display apparatus with a structure which alleviates loosening or creases of a display panel caused when a roll-slide display apparatus is changed from a default state into an expanded state, and simultaneously ensures the flexibility and the rigidity of the display panel will be described in detail. All the components of each display apparatus according to all embodiments of the present disclosure are operatively coupled and configured.

FIG. 1 is a block diagram illustrating a display apparatus according to an exemplary embodiment of the present disclosure.

Referring to FIG. 1, a display apparatus 100 according to the exemplary embodiment of the present disclosure can include a wireless communication unit 110, an input unit 120, a sensing unit 140, an output unit 150, an interface unit 160, a memory (or storage unit) 170, a controller 180 (e.g., one or more processors), and a power supply unit 190. The display apparatus 100 described in this specification according to various embodiments can include more components or less components than the above-described components.

The wireless communication unit 110 can include one or more modules which allow wireless communication between the display apparatus 100 and the wireless communication system, between the display apparatus 100 and other display apparatus, or between the display apparatus 100 and an external server. Further, the wireless communication unit 110 can include one or more modules which connect the display apparatus 100 to one or more networks.

The wireless communication unit 110 can include at least one of a broadcasting receiving module 111, a mobile communication module 112, a wireless internet module 113, a short-range (near field) communication module 114, and a position information module 115.

The broadcasting receiving module 111 of the wireless communication unit 110 can receive a broadcasting signal and/or broadcasting related information from an external broadcasting management server through a broadcasting channel. The broadcasting channel can include a satellite channel and a terrestrial channel. Two or more broadcasting receiving modules 111 for simultaneous broadcasting reception or broadcasting channel switching for at least two broadcasting channels can be provided to the display apparatus 100.

The mobile communication module 112 of the wireless communication unit 110 can transmit and receive a wireless signal with at least one of a base station, an external terminal, and a server on a mobile communication network constructed in accordance with technical standards or communication schemes for the mobile communication, for example, global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), or long term evolution advanced (LTE-A).

The wireless signal can include voice call signaling, video call signaling, or various types of data in accordance with transmission or reception of a text/multimedia message.

The wireless internet module 113 of the wireless communication unit 110 is a module for wireless internet connection and can be internally or externally installed in the display apparatus 100. The wireless internet module 113 can transmit or receive the wireless signal in the communication network in accordance with wireless internet techniques.

The wireless internet technique includes, for example, wireless LAN (WLAN), wireless fidelity (Wi-Fi), Wi-Fi direct, digital living network alliance (DLNA), wireless broadband (WiBro), World interoperability for microwave access (WiMAX), high speed downlink packet access (HSDPA), high speed uplink packet access (HSUPA), long term evolution (LTE), and long-term evolution-advanced (LTE-A). The wireless internet module 113 can transmit or receive data in accordance with at least one wireless internet techniques within a range including internet techniques which have not been described above.

The wireless internet connection by WiBro, HSDPA, HSUPA, GSM, CDMA, WCDMA, LTE, or LTE-A is performed by the mobile communication network so that the wireless internet module 113 which performs the wireless internet connection through the mobile communication network can be included in the mobile communication module 112.

The near field (short-range) communication module 114 of the wireless communication unit 110 is provided for short range communication and can support the short range communication using at least one of Bluetooth™, radio frequency identification (RFID), infrared data association (IrDA), ultra wideband (UWB), ZigBee, near field communication (NFC), wireless fidelity (Wi-Fi), Wi-Fi Direct, and wireless universal serial bus (wireless USB). The short-range communication module 114 can support wireless communication between the display apparatus 100 and the wireless communication system, between the display apparatus 100 and other display apparatus, or between the display apparatus 100 and a network in which other display apparatus (or external server) is located, through the wireless area networks. The short-range wireless communication network can be a wireless personal area network.

The position information module 115 of the wireless communication unit 110 can be a module for acquiring a position (or a current position) of the display apparatus 100. A representative example of the wireless communication unit 110 can be a global positioning system (GPS) module or a wireless fidelity (Wi-Fi) module. For example, the display apparatus 100 may utilize a GPS module to acquire a position of the display apparatus 100 using a signal sent from the GPS satellite. For example, the display apparatus 100 can acquire the position of the display apparatus 100 based on information of a wireless access point (AP) which transmits and receives wireless signals with the Wi-Fi module, by utilizing the Wi-Fi module. If necessary, the position information module 115 can perform any function of another module of the wireless communication unit 110 to obtain data substitutionally or additionally on the position of the display apparatus 100. The position information module 115 is a module used to acquire a position (or a current position)

of the display apparatus 100 and is not limited to a module which directly calculates or acquires the position of the display apparatus 100.

The input unit 120 can include a camera 121 or an image input unit which inputs an image signal, a microphone 122 or an audio input unit which inputs an audio signal, and a user input unit 123 (for example, a touch key or a mechanical key) which receives information from a user. Voice data or image data collected from the input unit 120 is analyzed to be processed as a control command of the user.

The camera 121 of the input unit 120 can process an image frame such as a still image or a moving image obtained by an image sensor in a video call mode or a photographing mode. The processed image frame can be displayed on the display unit 151 or stored in the memory 170. The plurality of cameras 121 provided in the display apparatus 100 can be disposed to form a matrix structure, and a plurality of image information having various angles or focal points can be input to the display apparatus 100 through the cameras 121 which forms the matrix structure. Further, the plurality of cameras 121 can be disposed to have a stereo structure to obtain a left image and a right image to implement a stereoscopic image.

The microphone 122 of the input unit 120 can process an external sound signal into electrical voice data. The processed voice data can be utilized in various forms in accordance with a function which is being performed by the display apparatus 100 (or an application program which is being executed). In the meantime, in the microphone 122, various noise removal algorithms for removing a noise generated during the process of receiving the external sound signal can be implemented.

The user input unit 123 of the input unit 120 receives information from the user, and when the information is input through the user input unit 123, the controller 180 can control the operation of the display apparatus 100 so as to correspond to the input information. The user input unit 123 can include a mechanical input means (or a mechanical key, for example, a button located on a front, rear, or side surface of the display apparatus 100, a dome switch, a jog wheel, or a jog switch) and a touch type input unit. For example, the touch type input unit can be formed by a virtual key, a soft key, or a visual key which is displayed on the touch screen through a software process, or a touch key which is disposed on a portion other than the touch screen. The virtual key or the visual key can be displayed on the touch screen with various shapes, and for example, can be formed by graphics, texts, icons, video, or a combination thereof.

The sensing unit 140 can include one or more sensors which sense at least one of information in the display apparatus 100, surrounding environment information around the display apparatus 100, and user information. For example, the sensing unit 140 can include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environment sensor (for example, a barometer, a hygrometer, a thermometer, a radiation sensor, a thermal sensor, or a gas sensor), and a chemical sensor (for example, an electronic nose, a healthcare sensor, or a biometric sensor). The display apparatus 100 according to the exemplary embodiment of the present disclosure can combine and utilize information sensed by at least two sensors from the above-mentioned sensors.

The output unit 150 generates outputs related to visual, auditory, or tactile senses, and can include at least one of a display unit 151, a sound output unit 152, a haptic module 153, and an optical output unit 154.

The display unit 151 forms a mutual layered structure with a touch sensor or is formed integrally to implement a touch screen. The touch screen simultaneously serves as a user input interface 123 which provides an input interface between the display apparatus 100 and the user and can provide an output interface between the display apparatus 100 and the user.

The sound output unit 152 of the output unit 150 can output audio data received from the wireless communication unit 110 or stored in the memory 170 in a call signal reception mode, a phone-call mode, a recording mode, a voice recognition mode, or a broadcasting reception mode. The sound output unit 152 can output a sound signal related to a function (for example, a call signal reception sound or a message reception sound) performed in the display apparatus 100. For example, the sound output unit 152 can include a receiver, a speaker, and a buzzer.

The haptic module 153 of the output unit 150 can generate various tactile effects that the user can feel. A representative example of the tactile effect generated by the haptic module 153 can be vibration. An intensity and a pattern of the vibration generated in the haptic module 153 can be controlled by the selection of the user or a setting of the controller. For example, the haptic module 153 can compose different vibrations to output the composed vibrations or sequentially output the different vibrations.

The optical output unit 154 of the output unit 150 outputs a signal for notifying occurrence of an event using light of a light source of the display apparatus 100. Examples of event generated in the display apparatus 100 can be message reception, call signal reception, missed call, alarm, schedule notification, email reception, and information reception through an application.

The interface unit 160 can serve as a channel with various external devices connected to the display apparatus 100. For example, the interface unit 160 can include at least one of a wired/wireless headset port, an external charger port, a wired/wireless data port, a memory card port, a port which connects a device equipped with an identification module, an audio input/output (I/O) port, a video input/output (I/O) port, and an earphone port. The display apparatus 100 can perform appropriate control related to the connected external device in accordance with the connection of the external device to the interface unit 160.

The memory 170 can store data that supports various functions of the display apparatus 100. The memory 170 can store a plurality of application programs (or applications) driven in the display apparatus 100, and data and instructions for operations of the display apparatus 100. Some application programs are downloaded from the external server through wireless communication to be installed in the display apparatus 100 or can be installed (or embedded) in the display apparatus 100 from the factory for a basic function (for example, a function for incoming and outgoing calls, receiving, and sending messages) of the display apparatus 100. The application program is stored in the memory 170 and is installed on the display apparatus 100 to be driven by the controller 180 to perform operations of the display apparatus 100.

In addition to the operation related to the application program, the controller 180 can control an overall operation of the display apparatus 100. The controller 180 processes a signal, data, or information which is input or output through the above-described components or drives the application programs stored in the memory 170 to provide or process appropriate information or functions to the user.

In order to drive the application program stored in the memory 170, the controller 180 can control at least some components of FIG. 1. For example, the controller 180 can combine and operate at least two or more of components included in the display apparatus 100 to drive the application program.

The power supply unit 190 is applied with external power or inside power to supply the power to the various components included in the display apparatus 100 under the control of the controller 180. The power supply unit 190 can include a battery, and the battery can be an embedded battery or a replaceable battery.

At least some of the above-described components can operate in cooperation with each other to implement the operation, the control, or the control method of the display apparatus 100 according to various embodiments which will be described below. Further, the operation, the control, or the control method of the display apparatus 100 can be implemented on the display apparatus 100 by driving at least one application program stored in the memory 170.

Figure 2A:
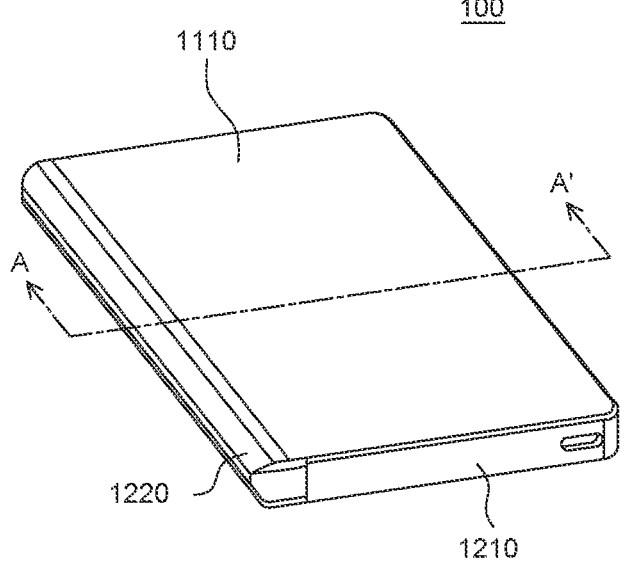
FIGS. 2A and 2B are perspective views of a display apparatus according to an exemplary embodiment of the present disclosure.
Figure 2B:
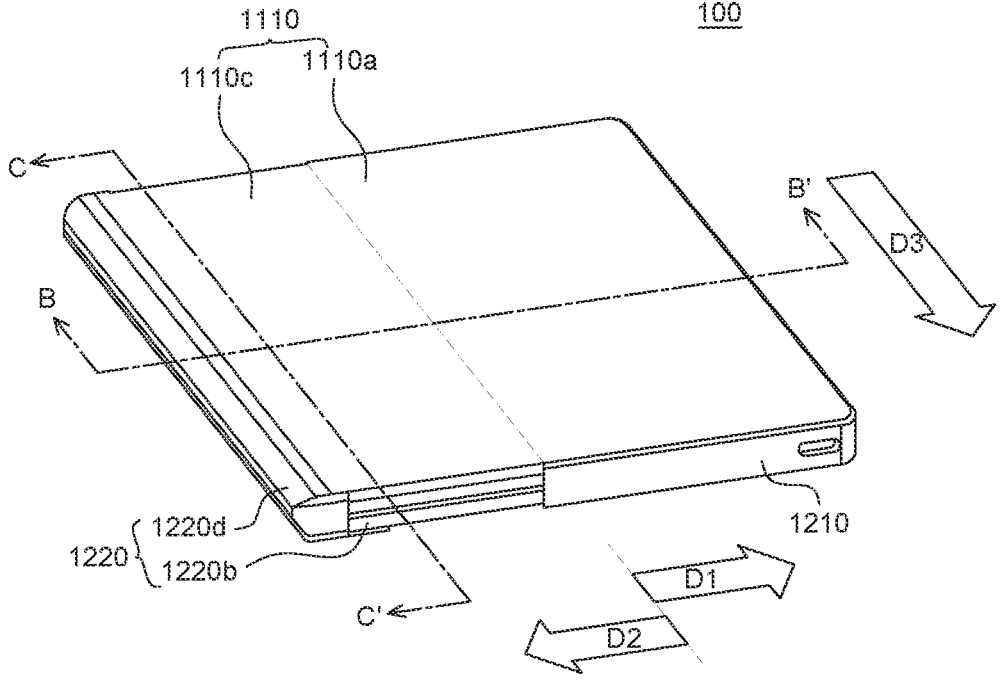
Figure 3A:
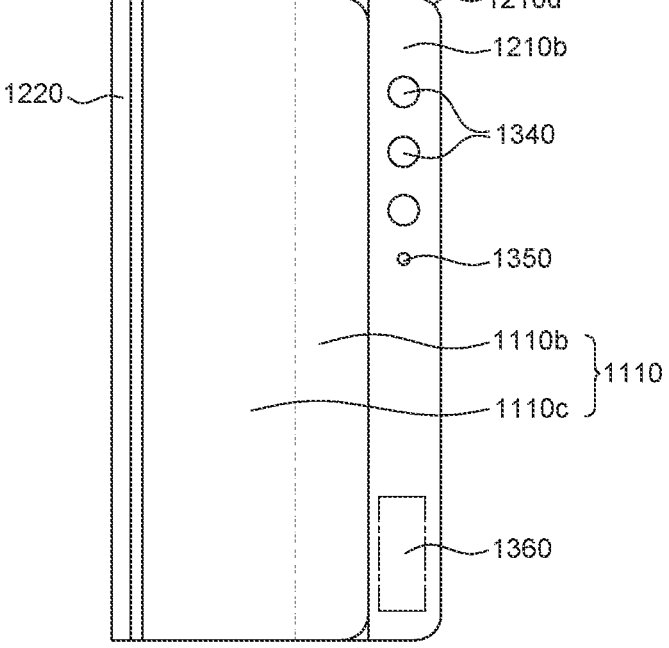
FIGS. 3A and 3B are rear views of a display apparatus according to an exemplary embodiment of the present disclosure.
Figure 3B:
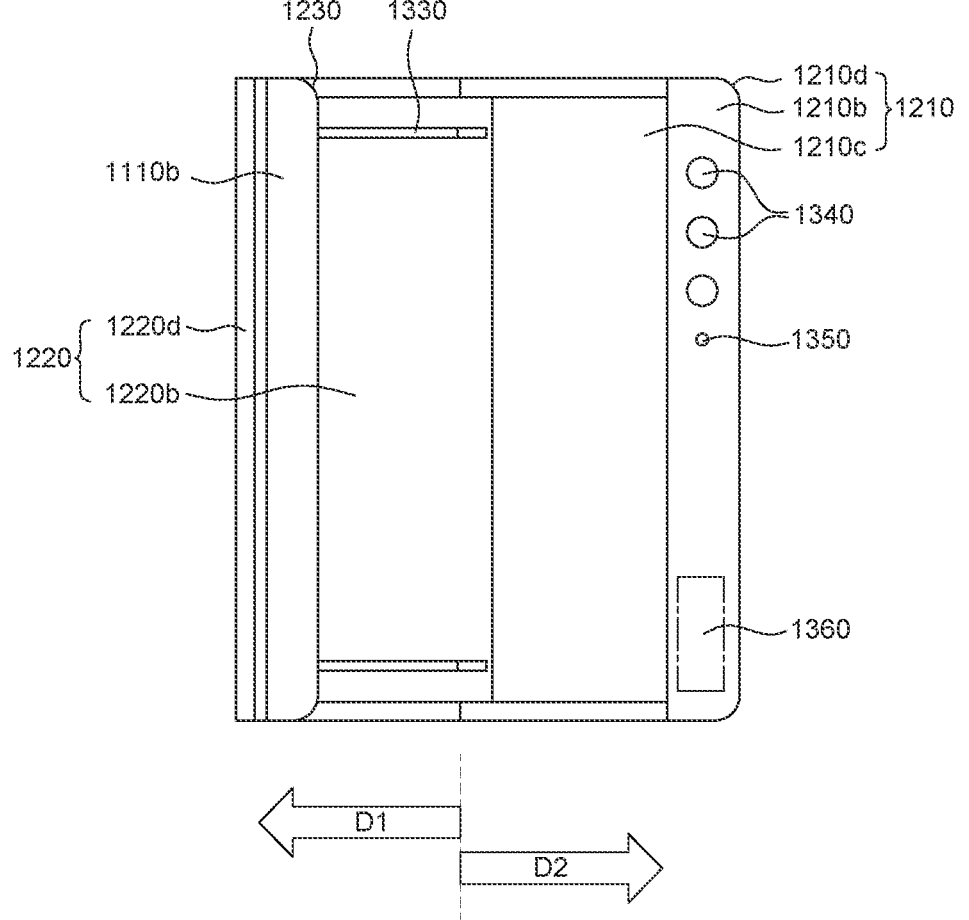
Figure 4A:
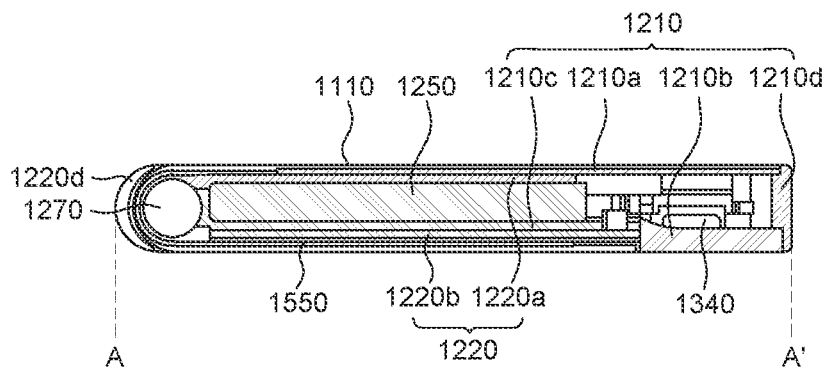
FIG. 4A is a cross-sectional view taken along a line A-A' of FIG. 2A.
Figure 4B:
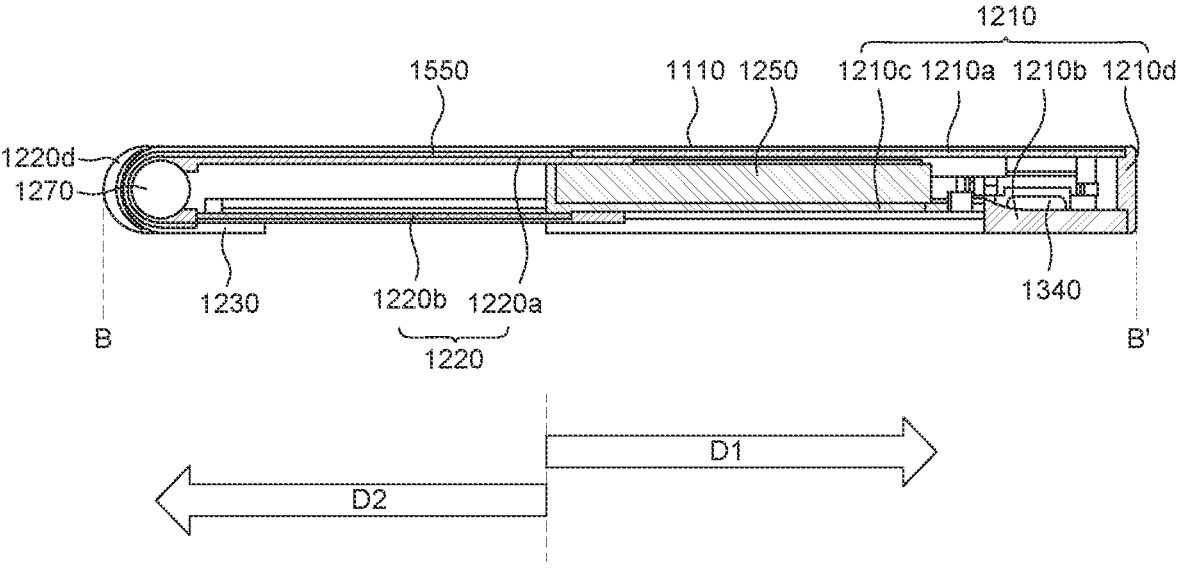
FIG. 4B is a cross-sectional view taken along a line B-B' of FIG. 2B.

FIGS. 2A and 2B are perspective views of a display apparatus according to an exemplary embodiment of the present disclosure. FIGS. 3A and 3B are rear views of a display apparatus according to an exemplary embodiment of the present disclosure. FIG. 4A is a cross-sectional view taken along the line A-A' of FIG. 2A. FIG. 4B is a cross-sectional view taken along the line B-B' of FIG. 2B.

Particularly, FIGS. 2A and 3A are views illustrating a second state of the display apparatus 100 according to the exemplary embodiment of the present disclosure, and FIGS. 2B and 3B are views illustrating a first state of the display apparatus 100 according to the exemplary embodiment of the present disclosure.

Further, FIG. 4A is a cross-sectional view taken along the line A-A' of FIG. 2A, and illustrates a cross-section of the display apparatus 100 in the second state. FIG. 4B is a cross-sectional view taken along the line B-B' of FIG. 2B, and illustrates a cross-section of the display apparatus 100 in the first state expanding in a first direction D1.

Referring to FIGS. 2A to 4B, the first state can be an expanding state of the display apparatus 100, and the second state can be a default state of the display apparatus 100, but are not limited thereto. For the convenience of description, a direction in which the display apparatus 100 expands in the first state is referred to a first direction D1, a direction contracted to switch from the first state to the second state is referred to a second direction D2, and a direction perpendicular to the second direction D2 is referred to a third direction D3.

The display apparatus 100 of the first state expands in the first direction D1 from the display apparatus 100 in the second state, and a size (or a width) of the display apparatus 100 is increased so that a size (or a width) of the display unit 1110 located on the front surface of the display apparatus 100 can also be increased. The display unit 1110 can be a flexible display unit, but the exemplary embodiments of the present disclosure are not limited thereto.

The display apparatus 100 of the second state is contracted in the second direction D2 from the display apparatus 100 in the first state, and a size (or a width) of the display apparatus 100 is reduced so that a size (or a width) of the display unit 1110 located on the front surface of the display apparatus 100 can also be reduced. For example, the size of the display unit 1110 in the second state can be smaller than the size of the display unit 1110 in the first state.

The display apparatus 100 according to the exemplary embodiment of the present disclosure can be switched from the second state in which the display unit 1110 is disposed on the front surface, as illustrated in FIG. 2A, to the first state by expanding the screen as illustrated in FIG. 2B.

In the first state, an area of the display unit 1110 located on the front surface is expanded and an area of a third area 1110c of the display unit 1110 located on the rear surface as illustrated in FIG. 3B is reduced. For example, the third area 1110c located on the rear surface in the second state can move in the front direction in the first state.

The display apparatus 100 according to the exemplary embodiment of the present disclosure can implement a flexible display in which the display unit 1110 is bent so that the position of the display unit 1110 is variable.

The flexible display can be a display which is manufactured on a thin and flexible substrate which can be bent, curved, folded, twisted, or rolled, like a paper while maintaining a display characteristic of the existing display configured on a rigid substrate to be light and deformable.

The flexible display unit 1110 can be deformed from the default state to a bent state which is not a flat state (for example, vertically or horizontally bent state). When an external force is applied to the display unit 1110, the display unit 1110 can be deformed to be a flat state (or a less bent state) or a much more bent state.

The flexible display unit 1110 is combined with a touch sensor to implement a flexible touch screen. When the touch is made on the flexible touch screen, the controller 180 in FIG. 1 can perform control corresponding to the touch input. The flexible touch screen can be configured to sense a touch input not only in a default state, but also in the deformed state.

The touch sensor can sense touch (or a touch input) applied to the touch screen using at least one of various touch types such as a resistive film type, a capacitive type, an infrared type, an ultrasonic type, and a magnetic field type.

For example, the touch sensor can be configured to convert a change of a pressure which is applied to a specific portion of the touch screen or a capacitance which is generated in a specific portion into an electrical input signal. The touch sensor can be configured to detect a position and an area where a touch object which applies touch to the touch screen is touched on the touch sensor, a pressure and a capacitance at the time of touch.

The display apparatus 100 according to the exemplary embodiment of the present disclosure can include a deformation sensing unit which can sense deformation of the flexible display unit 1110. For example, the deformation sensing unit can be included in the sensing unit 140 of FIG. 1.

The deformation sensing unit is provided in the flexible display unit 1110 or a case to sense information related to the deformation of the flexible display unit 1110. The information related to the deformation can be a deformed direction of the flexible display unit 1110, how much the flexible display unit 1110 is deformed, the deformed position, the deformed time, and an accelerator that the deformed flexible display unit 1110 is restored. Further, various information which can be sensed by the bending of the flexible display unit 1110 can also be included.

The controller 180 changes information displayed on the flexible display unit 1110 or can generate a control signal to control a function of the display apparatus 100, based on information related to the deformation of the flexible display unit 1110 sensed by the deformation sensing unit.

The state deformation of the flexible display unit 1110 may not be limited to an external force. For example, when the flexible display unit 1110 is in the second state, the flexible display unit can be switched to the first state by an instruction of the user or an application. The display apparatus 100 according to the exemplary embodiment of the present disclosure can include a driver to deform the flexible display unit 1110 without an external force.

The flexible display unit 1110 is bent at 180 degrees so that a part is located on a front surface of the display apparatus 100 and a part can be located on a rear surface of the display apparatus 100. An area of the flexible display unit 1110 is determined so that if the area of the flexible display unit 1110 located on the front surface is increased, the area of the flexible display unit 1110 located on the rear surface is reduced.

According to the exemplary embodiment of the present disclosure, the flexible display unit 1110 covers from the front surface to the rear surface so that a space for mounting an antenna implemented in a rear cover or a rear case as a component of the wireless communication unit 110 of FIG. 1 in the related art can be restricted. In order to solve this restriction, the antenna can be implemented in the flexible display unit 1110.

The antenna on display (AOD) is a transparent film type antenna configured by alternately laminating an electrode layer with an engraved pattern and a dielectric layer. The antenna on display can implement an antenna to be thinner than a laser direct structuring (LDS) technique which is implemented with a copper nickel plating method of the related art. Therefore, it is advantageous in that a thickness of the display apparatus 100 is not increased and the external appearance of the display apparatus is not exposed.

The antenna on display can transmit or receive a signal also in the direction in which the flexible display unit 1110 is located, and in the display apparatus 100 in which the flexible display unit 1110 is located on both surfaces like the exemplary embodiment of the present disclosure, the advantage of using the antenna on display can be doubled.

The display apparatus 100 according to the exemplary embodiment of the present disclosure can include a first frame 1210, a second frame 1220, and a third frame 1230 as frames which configure an outer periphery. The first frame 1210 slidably moves to the second frame 1220 in the first direction D1 and the third frame 1230 slidably can move to the second frame 1220 in the second direction D2.

The first frame 1210 and the second frame 1220 can include front surfaces, rear surfaces, and side surfaces. For example, the first frame 1210 and the second frame 1220 can configure the external appearance of the display apparatus 100 in a hexahedron shape. The shapes of the first frame 1210 and the second frame 1220 are not limited to the exemplary embodiments of the present disclosure.

The flexible display unit 1110 can include a first area 1110$a$, a second area 1110$b$, and a third area 1110$c$, and the first area 1110$a$ located at one side can be fixed to the first frame 1210. For example, the first area 1110$a$ can be fixed or coupled to the front surface of the first frame 1210. Further, the third area 1110$c$ adjacent to the first area 1110$a$ in the second direction D2 partially covers the front surface of the second frame 1220, and partially covers a rear surface of the second frame 1220.

The second area 1110$b$ located at the other side of the flexible display unit 1110 is located on the rear surface of the display apparatus 100, and is not directly coupled to the second frame 1220, but can be coupled to the third frame 1230. For example, the third frame 1230 can be a member which is slidably coupled in the second direction D2 on the rear surface of the second frame 1220. For example, the third frame 1230 can be a plate-shaped member, but the exemplary embodiments of the present disclosure are not limited thereto.

Referring to FIG. 3B, a slide slot 1330 extending in the first direction D1 can be formed in the second frame 1220, and the third frame 1230 can move along the slide slot 1330. Even though in FIG. 3B, it is illustrated that the slide slot 1330 is formed on the rear surface of the second frame 1220, the slide slot 1330 can be formed on the side surface of the second frame 1220, but the exemplary embodiments of the present disclosure are not limited thereto.

According to the exemplary embodiment of the present disclosure, the second area 1110$b$ can be fixed to the third frame 1230. The third area 1110$c$ is located between the first area 1110$a$ and the second area 1110$b$, and can be located on a front surface or a rear surface depending on a state of the display apparatus 100.

The first area 1110$a$ and the second area 1110$b$ maintain a flat default state without changing the shape, but the third area 1110$c$ can be bent to the other side of the second frame 1220 to be bent to the rear surface. When the state is switched from the second state to the first state, the area of the third area 1110$c$ located in the first direction D1 of the first area 1110$a$ can be increased. A position bent in the third area 1110$c$ can vary according to a sliding position of the second frame 1220, but the exemplary embodiments of the present disclosure are not limited thereto.

Since a foldable display apparatus which is folded or unfolded like a book is repeatedly bent at a specific location, force is repeatedly applied to only one location so that there can be a high risk of damage. In contrast, the bent portion of the flexible display unit 1110 according to the exemplary embodiment of the present disclosure varies depending on a state of the display apparatus 100. Accordingly, the fatigue due to the deformation which is intensively applied to only one location is reduced, which suppresses the damage of the flexible display unit 1110.

The first frame 1210 can include a first front surface portion 1210$a$ (see FIGS. 4A and 4B), a first rear surface portion 1210$b$ (see FIGS. 3A and 3B), and a second rear surface portion 1210$c$ (see FIGS. 3A and 3B). The first front surface portion 1210$a$ is coupled to the first area 1110$a$ of the flexible display unit 1110. The first rear surface portion 1210$b$ is outwardly exposed on the rear surface. The second rear surface portion 1210$c$ is covered by the second area 1110$b$ and the third area 1110$c$ of the flexible display unit 1110 in the second state and is exposed only in the first state.

The first rear surface portion 1210$b$ is exposed to the outside so that the camera 1340, the flash, and/or the proximity sensor 1350 can be disposed, but the exemplary embodiments of the present disclosure are not limited thereto. For example, the first rear surface portion 1210$b$ can be exposed to the outside, but the exemplary embodiments of the present disclosure are not limited thereto.

For example, in a bar-type terminal, a display unit for identifying a subject is disposed on only one side so that a camera 1340 for photographing subjects in the same side as the user and/or an opposite side to the user can be necessary on both the rear surface and the front surface of the display apparatus 100.

In the display apparatus 100 according to the exemplary embodiment of the present disclosure, the flexible display unit 1110 can be also located on the rear surface so that a subject located in an opposite side to the user and a subject located on the same side as the user can be identified by a single flexible display unit 1110, even using one camera 1340.

For example, the subject located on the same side as the user can be identified through the second area 1110b of the flexible display unit 1110, and the subject located on the opposite side to the user can be identified through the first area 1110a of the flexible display unit 1110.

The camera 1340 can include a plurality of cameras having different angles of view such as a wide angle, a super-wide angle, or a telescopic angle. In addition to the camera 1340, the proximity sensor 1350 and the sound output unit can be located on the first rear surface portion 1210b, and the antenna 1360 can be implemented on the first rear surface portion 1210b.

The first frame 1210 can further include a side surface portion 1210d which encloses the circumference of the display apparatus 100.

The side surface portion 1210d constitutes an external appearance of the display apparatus 100 by covering side portions of the display apparatus 100 excluding a portion through which the second frame 1220 is drawn in and out. The side surface portion 1210d is configured to cover both side portions spaced apart from each other in the third direction of the display device and a side portion connecting them. In the side surface portion 1210d, a user input unit to which a power port or an ear jack is connected, such as an interface unit or a volume button, can be disposed. When the side surface portion 1210d includes a metal material, the side surface portion 1210d can serve as an antenna.

The second frame 1220 can include a second front surface portion 1220a located on a rear surface of the first front surface portion 1210a of the first frame 1210, and a third rear surface portion 1220b which covers the rear surface of the second rear surface portion 1210c of the first frame 1210 (see FIGS. 4A and 4B).

The second front surface portion 1220a can support a part of the rear surface of the first area 1110a and a part of the rear surface of the third area 1110c of the flexible display unit 1110 which is expanded when the display apparatus 100 is switched to the first state.

A roller 1270 can be disposed at an end portion of the second frame 1220 in the second direction D2. The third area 1110c of the flexible display unit 1110 is wound around the roller 1270, and the roller 1270 can be configured to be cylindrical such that a wound portion is gently bent with a predetermined curvature. The flexible display unit 1110 may slidably move in one direction or other direction through the roller 1270 at a side surface.

The roller 1270 is disposed on the end portion of the second direction D2 in the second frame 1220 and abuts onto an inner surface of the flexible display unit 1110 and can rotate together with the movement of the flexible display unit 1110. By doing this, when the first frame 1210 slides, the flexible display unit 1110 slides from the rear surface to the front surface or from the front surface to the rear surface.

The flexible display unit 1110 wound around the roller 1270 is located on the end portion of the second direction D2 of the display apparatus 1110 so that when an impact such as dropping of the display apparatus 100 is applied, there can be a risk of damage.

In order to suppress the damage, the second frame 1220 can further include a side frame 1220d to protect the flexible display unit 1110 wound around the roller 1270.

Further, the side frame 1220d according to the exemplary embodiment of the present disclosure can suppress the damage problem caused when a surface of the flexible display unit 1110 which is bent to be outwardly folded is outwardly exposed so that the durability of the display apparatus 100 can be improved.

The side frame 1220d can be formed of an opaque material or a transparent material or can be also configured by mixing the opaque material and the transparent material. When the side frame 1220d includes a transparent portion formed of a transparent material, an image or letters output from the flexible display unit 1110 can be seen through the transparent portion. Further, the user input can be performed on a side surface using a touch sensor of the flexible display unit 1110.

For the purpose of touch input, the side frame 1220d can partially include a conductive material. For example, a protrusion is formed in a portion of the side frame 1220d where a conductive material is included, and the user touches the protrusion to input an instruction.

As illustrated in FIGS. 4A and 4B, the side frame 1220d can be configured such that a center portion of the inner surface corresponding to the curvature of the flexible display unit 1110 wound around the roller 1270 is formed to be thicker to ensure the rigidity with a natural curved surface.

A battery 1250 can be disposed in a space between the second front portion 1220a and the second rear surface portion 1210c. The battery 1250 can be an embedded type or an exchangeable type.

Figure 5:
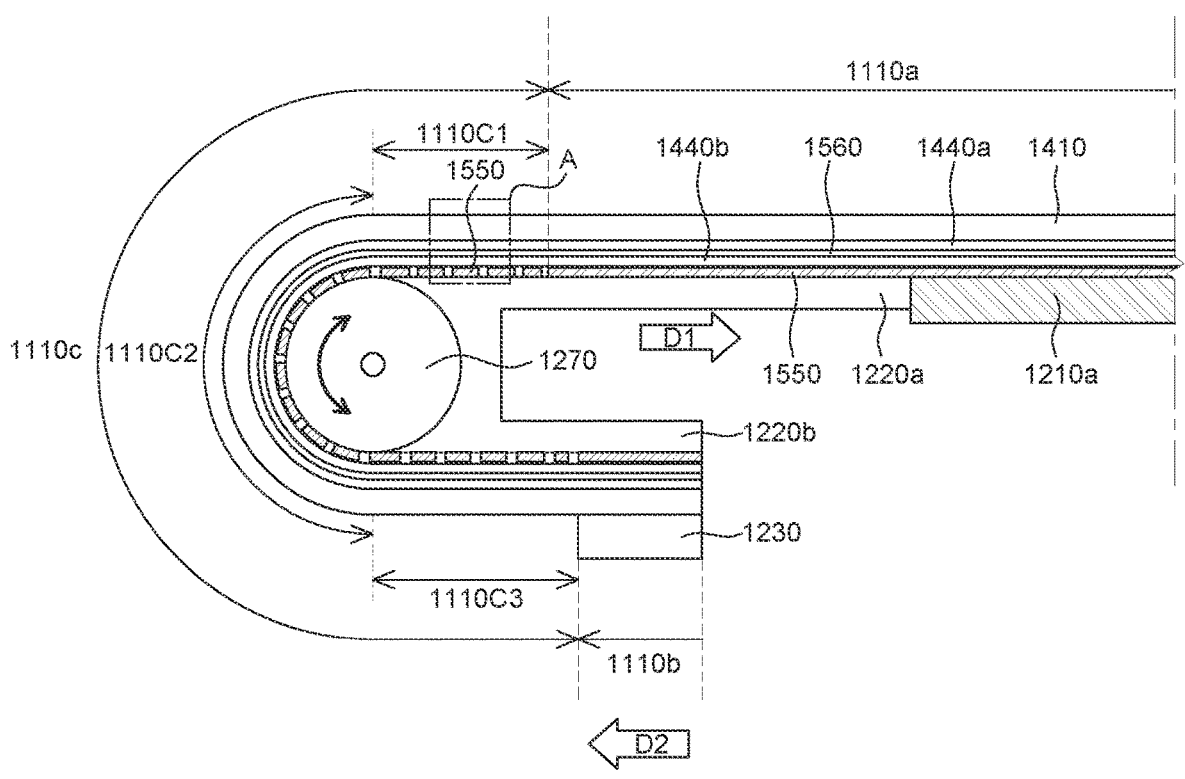
FIG. 5 is a view illustrating a part of a cross-section of FIG. 4A.
Figure 6:
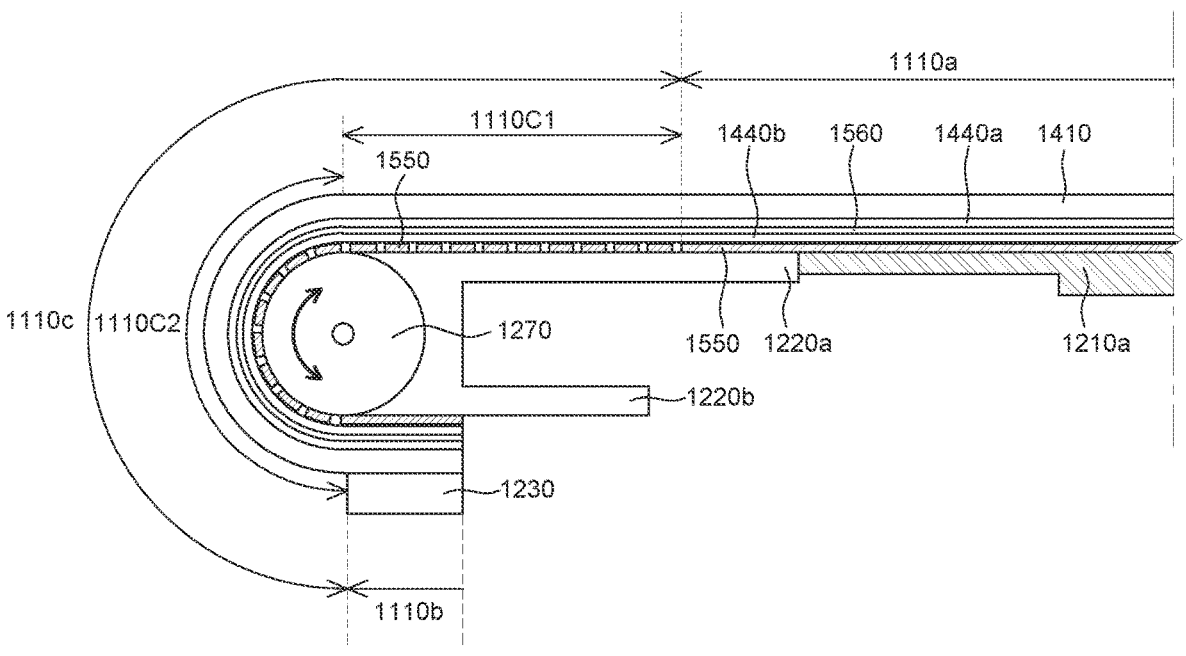
FIG. 6 is a view illustrating a part of a cross-section of FIG. 4B.
Figure 7:
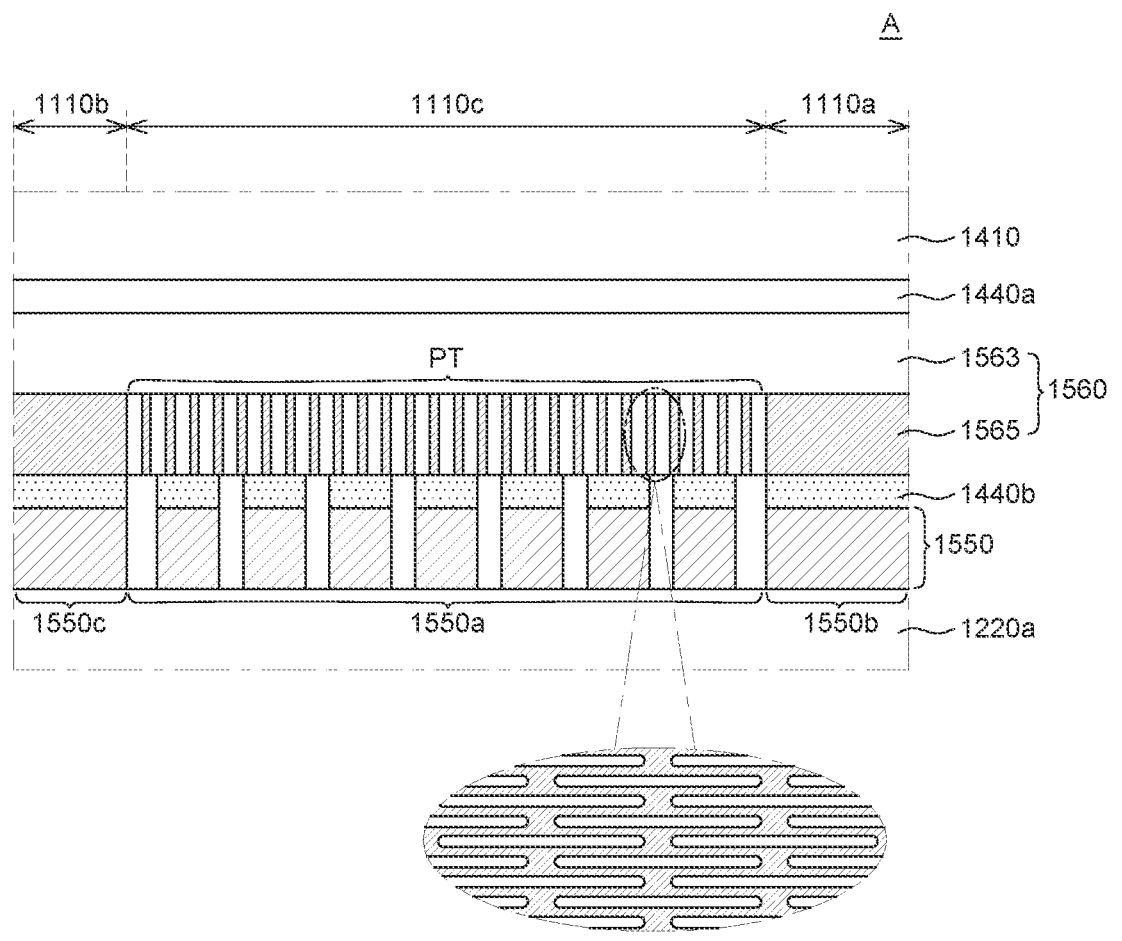
FIG. 7 is an enlarged view of a portion A of FIG. 5 according to an exemplary embodiment of the present disclosure.
Figure 8:
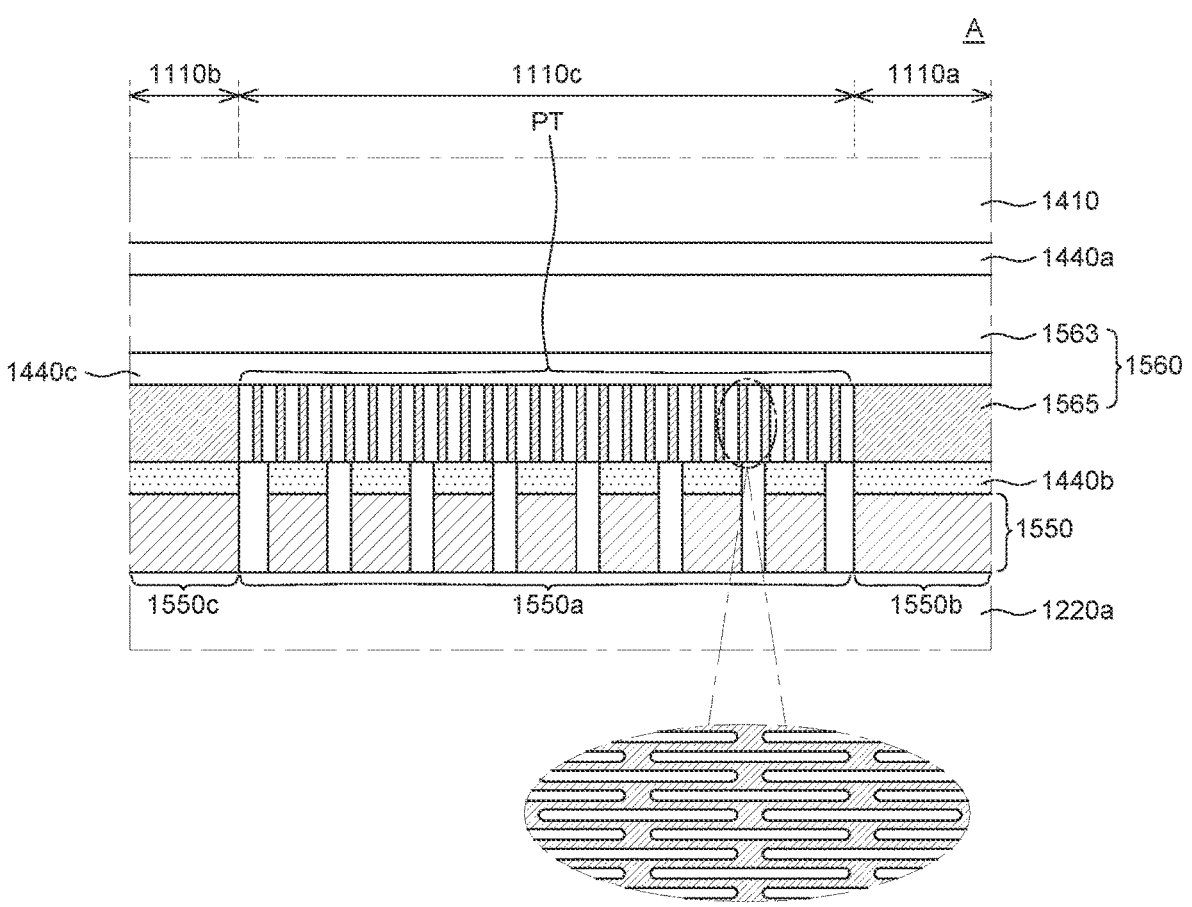
FIG. 8 is an enlarged view of a portion A of FIG. 5 according to another exemplary embodiment of the present disclosure.

FIG. 5 is a view illustrating a part of a cross-section of FIG. 4A. FIG. 6 is a view illustrating a part of a cross-section of FIG. 4B. FIG. 7 is a view of an enlarged portion A of FIG. 5 according to an exemplary embodiment of the present disclosure. FIG. 8 is a view of an enlarged portion A of FIG. 5 according to another exemplary embodiment of the present disclosure.

Particularly, FIG. 5 is a view illustrating a part of a cross-section of a display apparatus in a second state according to an embodiment of the present disclosure. In addition, FIG. 6 is a view illustrating a part of a cross-section of a display apparatus in a first state according to an embodiment of the present disclosure.

Description of the components of FIGS. 5 to 8 is substantially the same as the components of FIGS. 2A to 4B so that the description may be omitted or may be simplified.

Referring to FIGS. 5 and 6, the flexible display unit 1110 can include a display panel 1410 which outputs an image, a first member 1550 and a second member 1560 which support a rear surface of the display panel 1410, and a first frame 1210 and a second frame 1220 which support the flexible display unit 1110.

The flexible display unit 1110 can include a first area 1110a located at one side, a second area 1110b located at the other side, and a third area 1110c located between the first area 1110a and the second area 1110b, depending on a position and a function in the display apparatus 100.

The first area 1110a located at one side of the flexible display unit 1110 is located on the front surface of the display apparatus 100 and can be fixed to the front surfaces of the first frame 1210 and the second frame 1220. For example, a part of the first area 1110a can be located above the first front surface portion 1210a of the first frame 1210. For example, the other part of the first area 1110a can be located above the second front surface portion 1220a of the second frame 1220.

The first area 1110a can move in the first direction D1 or the second direction D2 with respect to the second frame 1220 depending on the first state or the second state of the display apparatus 100.

The second area 1110b located on the other side of the flexible display unit 1110 can be located on the rear surface of the display apparatus 100. The second area 1110b is not directly coupled to the second frame 1220 but can be connected or coupled to the third frame 1230. For example, an upper surface of the second area 1110b can be connected or coupled to the third frame 1230 and a lower surface of the second area 1110b can be located on the third rear surface portion 1220b of the second frame 1220.

The second area 1110b can move in the second direction D2 or the first direction D1 depending on the first state or the second state of the display apparatus 100.

The third area 1110c of the flexible display unit 1110 can be disposed between the first area 1110a and the second area 1110b to be bent over the front surface, the side surface, and the rear surface of the display apparatus 100. The third area 1110c is partially located above the second front surface portion 1220a of the second frame 1220 and can be partially located below the third rear surface portion 1220b of the second frame 1220, but the exemplary embodiments of the present disclosure are not limited thereto.

The third area 1110c can include a 3-2-th area (or a bending area) 1110C2 which is in contact with the roller 1270, a 3-1-th area (or a front surface area) 1110C1 and a 3-3-th area (or a rear surface area) 1110C3 which are not in contact with the roller 1270.

For example, in the second state of the display apparatus 100, the third area 1110c can include a 3-1-th area 1110C1, a 3-2-th area 1110C2, and a 3-3-th area 1110C3. The 3-1-th area 1110C1 is adjacent to the first area 1110a on the front surface and is not in contact with the roller 1270, the 3-2-th area 1110C2 is in contact with the roller 1270, and the 3-3-th area 1110C3 is adjacent to the second area 1110b of the rear surface and is not in contact with the roller 1270.

In the first state of the display apparatus 100, an area of the 3-1-th area 1110C1 of the third area 1110c can be enlarged and an area of the 3-3-th area 1110C3 can be reduced. For example, in the first state of the display apparatus 100, the third area 1110c can be configured only by a third 3-1-th area 1110C1 which is adjacent to the first area 1110a and is not in contact with the roller 1270 and a 3-2-th area 1110C2 which is in contact with the roller 1270. However, the exemplary embodiments of the present disclosure are not limited thereto.

The display panel 1410 can use one of various display panels such as an organic light emitting display panel and a liquid crystal display panel. The display panel 1410 is a configuration which displays images to the user and can include the plurality of sub pixels.

In the display panel 1410, the plurality of scan lines and the plurality of data lines intersect each other and each of the plurality of sub pixels can be connected to the scan line and the data line. In addition, each of the plurality of sub pixels can be connected to the high potential power line, the low potential power line, the initialization signal line, and the emission control signal line.

The sub pixel is a minimum unit which configures a screen and each of the plurality of sub pixels can include a light emitting diode and a pixel circuit for driving the light emitting diode. The plurality of light emitting diodes can be defined in different ways depending on a type of the display panel 1410. For example, when the display panel 1410 is an organic light emitting display panel, the light emitting diode can be an organic light emitting diode which includes an anode, a light emitting unit, and a cathode. Hereinafter, even though the description will be made under the assumption that the light emitting diode is the organic light emitting diode, the type of the light emitting diode is not limited thereto. For example, the light emitting diode can be an inorganic light emitting diode or a quantum dot, but the exemplary embodiments of the present disclosure are not limited thereto.

A pixel circuit is a circuit for controlling the driving of the light emitting diode. For example, the pixel circuit can be configured to include a plurality of transistors and a capacitor, but is not limited thereto.

Further, the display panel 1410 can have flexibility so as to be bent in accordance with the bending of the display apparatus 100. The flexible display can be a display which is manufactured on a thin and flexible substrate which is bendable, foldable, twistable, or rollable like a paper while maintaining a display characteristic of the existing display configured on a rigid substrate to be light and deformable.

The display apparatus 100 according to the exemplary embodiment of the present disclosure can manually or automatically switch the state between the first state and the second state. In the automatic manner, a driver can be included in the display apparatus 100 for a sliding operation.

The driver slidably moves the first frame 1210 relatively in the first direction D1 with respect to the second frame 1220 and can slidably move the third frame 1230 relatively in the second direction D2 with respect to the second frame 1220.

When the second state is switched to the first state, if the first frame 1210 moves by a first distance with respect to the second frame 1220, the flexible display unit 1110 can move by a second distance corresponding to the first distance. For example, the movement distance of the first frame 1210 may not accurately match the movement distance of the flexible display unit 1110 but can be in proportion thereto. In order to move the end portion of the flexible display unit 1110 by the second distance, the third frame 1230 can move by the same distance as the first frame 1210, with respect to the second frame 1220.

The driver can use a linear motor which operates in a straight direction to compensate for this deformation, but the exemplary embodiments of the present disclosure are not limited thereto. The display apparatus 100 according to the exemplary embodiment of the present disclosure can further include an additional state as well as the first state and the second state. For example, the linear motor which drives the state switching can be configured by at least two stages but is not limited thereto.

Even though only one driver can be provided, in order to stably change the state of the display apparatus 100, one pair of drivers can be provided on both sides in the third direction. A component such as a battery can be disposed between one pair of drivers.

The display apparatus 100 according to the exemplary embodiment of the present disclosure can include a structure pulling the flexible display unit 1110 in both directions toward the first area 1110a and the second area 1110b to maintain flatness of the display panel 1410 in an area other than a 3-2-th area 1110C2. In the 3-2-th area, the flexible display unit 1110 is bent to be in contact with the roller 1270. For example, a tensile force can be applied to the display panel 1410 in the first direction D1 and the second direction D2.

Referring to FIGS. 5 to 8, the flexible display unit 1110 of the display apparatus 100 according to the exemplary embodiment of the present disclosure can include a display panel 1410, a first adhesive layer 1440a, a second member 1560, a second adhesive layer 1440b, and a first member 1550. The description of the components of FIG. 7 is substantially the same as that of the components of FIGS. 5 and 6 so that the description may be omitted or may be simplified.

In order to supplement the rigidity of the display panel 1410, the second member 1560 and the first member 1550 can be disposed on the rear surface of the display panel 1410. The second member 1560 may be between the display panel 1410 and the first member 1550. The second member 1560 can be configured by a 2-1-th member 1563 which is in contact with or adjacent to the display panel 1410 and a 2-2-th member 1565 which is in contact with or adjacent to the first member 1550.

The 2-1-th member 1563 supplies the rigidity to the display panel 1410 to reduce or offset an external force which is applied to the display panel 1410. The 2-1-th member 1563 can suppress a transferring phenomenon that a pattern of the 2-2-th member 1565 or the first member 1550 located on a rear surface thereof is recognized from the outside through the display panel 1410.

The 2-1-th member 1563 can be a metal such as stainless use steel (SUS), a foaming acrylic resin foam, or an elastomer material to improve the impact resistance characteristic, but the exemplary embodiments of the present disclosure are not limited thereto.

The 2-2-th member 1565 can be located between the 2-1-th member 1563 and the first member 1550. The 2-2-th member 1565 can be configured by a metal material such as stainless use steel (SUS), but the exemplary embodiments of the present disclosure are not limited thereto. The 2-2-th member 1565 supplies the rigidity to the display panel 1410 to reduce or offset an external force which is applied to the display panel 1410.

The 2-1-th member 1563 and the 2-2-th member 1565 can have a plate shape, but the exemplary embodiments of the present disclosure are not limited thereto. The 2-1-th member 1563 can be a top plate, a plate top, or a first rigid member, but the exemplary embodiments of the present disclosure are not limited thereto. The 2-2-th member 1565 can be a bottom plate, a plate bottom, or a second rigid member, but the exemplary embodiments of the present disclosure are not limited thereto.

The flexible display unit 1110 needs to have durability or rigidity against an external force which is applied from the front surface of the display panel 1410 and needs to flexibly change the shape according to the switching to the first state or the second state of the display apparatus 100.

In order to implement the rigidity and the flexibility, which are contrary properties to each other, a pattern unit PT in which fine patterns for increasing the flexibility are disposed can be disposed in a part of the 2-2-th member 1565. The pattern can be a circular, rectangular, rod, or mesh type, but the exemplary embodiments of the present disclosure are not limited thereto.

The pattern unit PT can be located in an area corresponding to the third area 1110c of the display panel 1410. For example, the pattern unit PT can be located in the 3-2-th area 1110C2 and/or a surrounding area of the 3-2-th area 1110C2 with which the flexible display unit 1110 and the roller 1270 are in contact.

When the 2-1-th member 1563 is configured by the foaming acrylic resin foam or an elastomer material, the material is filled in the pattern unit PT of the 2-2-th member 1565 to additionally ensure the rigidity and can suppress the inflow of foreign materials into the pattern unit PT of the 2-2-th member 1565. The material of the 2-1-th member 1563 does not limit the content of the present disclosure.

The first member 1550 can be located on the rear surface of the second member 1560. The first member 1550 supplies the rigidity to the display panel 1410 to offset an external force which is applied to the display panel 1410. The first member 1550 can offset a force which pushes the roller 1270 by the display panel 1410 and a frictional force between the display panel 1410 and the roller 1270 in accordance with the tensile force to the first direction D1 and the second direction D2 which is applied to the display panel 1410.

The first member 1550 can include a rib portion 1550a in which a plurality of rail shaped ribs is disposed to be perpendicular to the first direction D1, a first flat portion 1550b at one side of the rib portion 1550a, and a second flat portion 1550c at the other side which is different from the one side of the rib portion 1550a.

The first member 1550 can be configured by a metal material such as stainless use steel (SUS), but the exemplary embodiments of the present disclosure are not limited thereto. Widths and heights of each of the rib portion 1550a, the first flat portion 1550b, and the second flat portion 1550c can be the same, but the exemplary embodiments of the present disclosure are not limited thereto.

The rib portion 1550a can be located in an area corresponding to the third area 1110c of the flexible display unit 1110. For example, the rib portion 1550a can be disposed so as to correspond to the pattern unit PT of the 2-2-th member 1565.

In the rib portion 1550a, a plurality of rail shaped ribs can be disposed. The rib can be a rail or a roll belt, but the exemplary embodiments of the present disclosure are not limited thereto. The ribs support the rear surface of the third area 1110c of the flexible display unit 1110 to apply the rigidity. Further, the ribs can offset a force which pushes the roller 1270 by the display panel 1410 and a frictional force between the display panel 1410 and the roller 1270 in accordance with the tensile force to the first direction D1 and the second direction D2 which is applied to the display panel 1410.

The first flat portion 1550b can be located at one side of the rib portion 1550a. The first flat portion 1550b can be located in the first area 1110a of the flexible display unit 1110. The first flat portion 1550b supports the rear surface of the first area 1110a of the flexible display unit 1110 to apply the rigidity.

The second flat portion 1550c can be located at the other side of the rib portion 1550a which is different from the one side. The second flat portion 1550c can be located in the second area 1110b of the flexible display unit 1110. The second flat portion 1550c supports the rear surface of the second area 1110b of the flexible display unit 1110 to apply the rigidity.

The first adhesive layer 1440a can be disposed between the display panel 1410 and the second member 1560. The first adhesive layer 1440a can be omitted according to the material of the 2-1-th member 1563.

The second adhesive layer 1440b can be disposed between the second member 1560 and the first member 1550. The second adhesive layer 1440b can be disposed in accordance with the shape of the first member 1550. For example, the second adhesive layer 1440b which is in contact with the rib portion 1550a of the first member 1550 can be located in accordance with the shape of the ribs. For example, the second adhesive layer 1440b which is in contact with the first flat portion 1550b or the second flat portion 1550c of the first member 1550 can be evenly spread on the plane. The first adhesive layer 1440a and the second adhesive layer 1440b may be configured by an optically clear adhesive film.

Referring to FIG. 8, the flexible display unit 1110 of the display apparatus 100 according to another embodiment of the present disclosure can further include, in addition to the components shown in FIG. 7, a third adhesive layer 1440c disposed between the 2-1-th member 1563 and the 2-2-th member 1565. The description of the components of FIG. 8 is substantially the same as that of the components of FIG. 7 so that the description may be omitted or may be simplified.

As shown in FIG. 8, the 2-1-th member 1563 which is disposed to improve the impact resistance characteristic can be configured by a metal such as stainless use steel (SUS), a foaming acryl resin foam, or an elastomer material, but the exemplary embodiments of the present disclosure are not limited thereto. When the 2-1-th member 1563 is a foaming acrylic resin foam or an elastomer material, the 2-1-th member 1563 is filled in the pattern units PT of the 2-2-th member 1565 to provide the adhesiveness between the 2-1-th member 1563 and the 2-2-th member 1565. For example, the adhesive layer may not be disposed between the 2-1-th member 1563 and the 2-2-th member 1565.

However, when the 2-1-th member 1563 is a metal material, such as SUS, the adhesiveness with the 2-2-th member 1565 is necessary so that the third adhesive layer 1440c can be disposed between the 2-1-th member 1563 and the 2-2-th member 1565.

In the second area 1110b of the flexible display unit 1110 according to the exemplary embodiment of the present disclosure, loosening or creases of the bending unit of the display panel 1410 can be generated in accordance with the delay of the original form recovery according to the first state and the second state.

In order to reduce the loosening or creases by maintaining the flatness of the display panel 1410, a structure which pulls the flexible display unit 1110 in both directions toward the first area 1110a and the second area 1110b can be included. For example, it can be configured that a tensile force is generated in the first direction D1 and the second direction D2 of the display panel 1410.

The inventor of the present disclosure invented a structure for additionally reinforcing a recovery force of the original form of the display panel 1410 in the second area 1110b of the flexible display unit 1110. Hereinafter, this will now be described in detail.

Figure 9A:
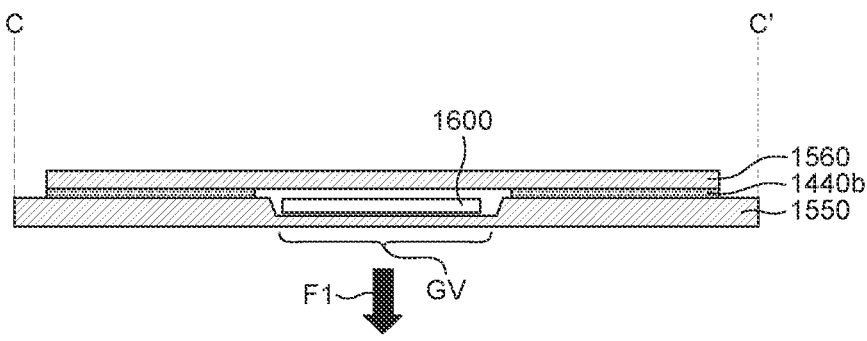
FIG. 9A is a cross-sectional view taken along a line C-C' of FIG. 2B according to an embodiment of the present disclosure.
Figure 9B:
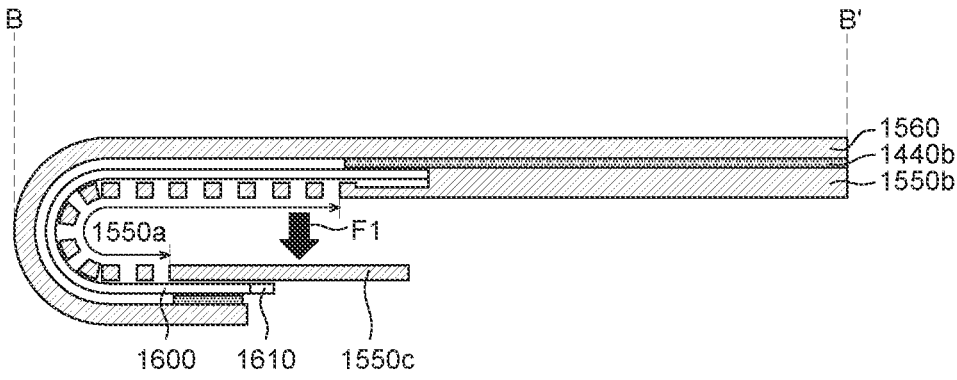
FIG. 9B is a cross-sectional view taken along the line B-B' of FIG. 2B according to an embodiment of the present disclosure.

FIG. 9A is a cross-sectional view taken along the line C-C' of FIG. 2B according to an embodiment of the present disclosure, and FIG. 9B is a cross-sectional view taken along the line B-B' of FIG. 2B according to the an embodiment of the present disclosure.

Referring to FIGS. 9A and 9B, the flexible display unit 1110 of the display apparatus 100 according to an embodiment of the present disclosure can include a second member 1560 (for example, a 2-2-th member 1565), a second adhesive layer 1440b, a first member 1550, and a third member 1600. The description of the components of FIGS. 9A and 9B is substantially the same as that of the components of FIGS. 2A to 8 so that the description may be omitted or may be simplified.

The 2-2-th member 1565 supplies the rigidity to the display panel 1410 to offset an external force which is applied to the display panel 1410.

The first member 1550 located on the rear surface of the 2-2-th member 1565 supplies the rigidity to the display panel 1410 to offset an external force which is applied to the display panel 1410. The first member 1550 can include a rib portion 1550a located in the second area 1110b, a first flat portion 1550b located in the first area 1110a, and a second flat portion 1550c located in the third area 1110c.

The second adhesive layer 1440b can be disposed between the second member 1560 and the first member 1550. The second adhesive layer 1440b can be disposed in accordance with the shape of the first member 1550. For example, the second adhesive layer 1440b which is in contact with the rib portion 1550a can be located in accordance with the shape of the rib, and the second adhesive layer 1440b which is in contact with the first flat portion 1550b or the second flat portion 1550c can be evenly spread on the plane.

The first member 1550 can include a groove portion GV which has a predetermined width and a depth on a top surface thereof and is formed with a predetermined length parallel to the first direction D1. A top surface is partially removed in one direction in the groove portion GV. The groove portion GV begins from a part of the second flat portion 1550c, passes through the rib portion 1550a, and can reach the first flat portion 1550b. For example, the groove portion GV can be formed over a part of the first flat portion 1550b, the entire rib portion 1550a, and a part of the second flat portion 1550c. For example, a length of the groove portion GV can be longer than that of the third area 1110c and shorter than that of the flexible display unit 1110.

The groove portion GV can have a rectangular shape, but the exemplary embodiment of the present disclosure is not limited thereto. A bottom surface of the groove portion GV can be parallel to a top surface of the first member 1550. A long side and/or a short side which connects the top surface of the first member 1550 and the bottom surface of the groove portion GV can be configured at a right angle (90 degrees) or an acute angle (which is equal to or smaller than 90 degrees) from the bottom surface of the groove portion GV. However, the exemplary embodiments of the present disclosure are not limited thereto.

In an area in which the groove portion GV is disposed, the second adhesive layer 1440b may not be disposed. For example, the second adhesive layer 1440b may not be configured between the 2-2-th member 1565 and the groove portion GV.

The third member 1600 can be disposed in the groove portion GV of the first member 1550. A width of the third member 1600 can be smaller than a width of the groove portion GV. For example, the width of the groove portion GV can be larger than the width of the third member 1600.

The third member 1600 is in contact with the bottom surface of the groove portion GV but may not be in contact with the 2-2-th member 1565. For example, a distance between the bottom surface of the groove portion GV and a lower surface of the 2-2-th member 1565 can be larger than a height of the first member 1550. For example, the third member 1600 and the 2-2-th member 1565 in the groove portion GV can be spaced apart from each other.

The length of the third member 1600 can be larger than the length of the groove portion GV. One side of the third member 1600 can be fixed to the upper surface of the first flat portion 1550b and a lower surface of the 2-2-th member 1565 to be in contact with each other. For example, one side of the third member 1600 can be in contact with the upper surface of the first flat portion 1550b of the first member 1550, beyond a cross-section of one side of the groove portion GV of the first member 1550. For example, one side of the third member 1600 can be out of the groove portion GV to be in contact with the lower surface of the 2-2-th member 1565. For example, the second adhesive layer 1440b may not be configured between the first flat portion 1550b and the 2-2-th member 1565 in which one side of the third member 1600 is disposed to reduce the thickness of the flexible display unit 1110.

In order to fix the other side of the third member 1600, a fixing unit 1610 can be disposed in an overlapping portion or an overlapping position of the third member 1600 and the second flat portion 1550c. The fixing unit 1610 is configured in the second flat portion 1550c, and can fix a lower surface, a longitudinal section, and side surfaces of both sides of the longitudinal section of the third member 1600. For example, the fixing unit 1610 can have a "U" shape seen from the top surface. A top surface of the other side of the third member 1600 can be in contact with the 2-2-th member 1565. For example, the second adhesive layer 1440b can be configured between the third member 1600 and the 2-2-th member 1565 to enhance the fixing force.

The third member 1600 has a structure in which both ends are fixed, and can include a structure which pulls both ends of the third member 1600 to the first direction D1 in each position according to the first state or the second state of the display apparatus 100. For example, it can be configured to generate the tensile force in one side and the other side of the third member 1600 in the first direction D1, respectively. One side of the third member 1600 may be fixed between the first flat portion 1550b and the second member 1560, and the other side of the third member 1600 may be fixed between the second flat portion 1550c and the fixing unit 1610.

The 3-2-th area 1110C2 of the third area 1110c of the flexible display unit 1110 can cause the loosening or creases of the display panel 1410 in accordance with the delay of the original form recovery while moving the bending unit according to the first state or the second state of the display apparatus 100. The loosening or creases of the display panel 1410 can deteriorate a display quality of the display apparatus 100, and degradation of the touch sense and an operation failure problem at the time of touch input of the display apparatus 100 can be caused.

The loosening or creases of the display panel 1410 can affect all the members which are bonded to the display panel 1410 on the rear surface of the display panel 1410. For example, the second member 1560 and the first member 1550 of the rear surface of the display panel 1410 can be loosened as much as the display panel 1410 is loosened.

The tensile force from both ends of the third member 1600 can act the third member 1600 to press the loosened area of the display panel 1410 as the original form recovery is delayed. For example, the tensile force which acts to maintain the flatness of the third member 1600 in a loosened area of the display panel 1410 is in tangent with the loosening direction of the first member 1550 to apply a force F1 to an opposite direction. Accordingly, a time to recover the original form or a delayed time to recover the original form can be shortened.

For example, the tensile force which acts to maintain the flatness of the third member 1600 acts on the first member 1550 and the second member 1560 bonded thereto, and the display panel 1410 to be parallel to reduce the loosening or creases of the display panel 1410. By doing this, the degradation of the display quality of the display apparatus 100 can be suppressed, and degradation of the touch sense and an operation failure problem at the time of touch input of the display apparatus 100 can be solved.

The third member 1600 can be a material which has a strong recovery force to the original form and overcomes the tensile force at both ends (or both sides). The third member

1600 can be a metal material such as stainless use steel (SUS), but the exemplary embodiments of the present disclosure are not limited thereto.

A configuration of the groove portion GV for reducing the loosening or creases of the display panel 1410 and the third member 1600 can be configured not by one set, but by a plurality of sets. The degree of loosening or creases of the display panel 1410 is high at a center of the third direction D3 of the display panel 1410 so that for example, three sets of a center, an upper portion, and a lower portion of the third direction D3 of the display panel 1410 can be configured. However, the exemplary embodiments of the present disclosure are not limited thereto. For example, predetermined two points with respect to the third direction D3 of the display panel 1410 are selected to configure two sets.

Figure 10A:
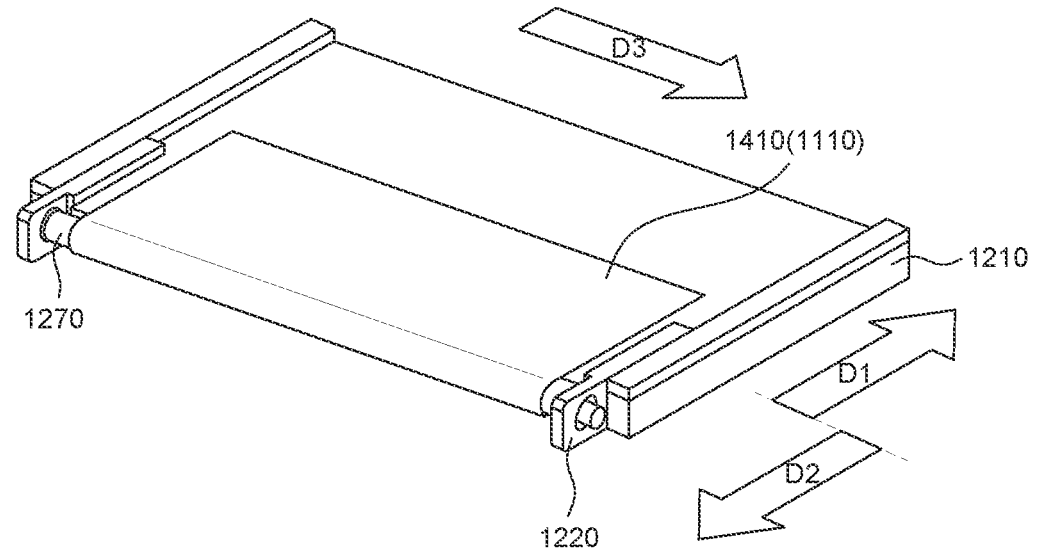
FIGS. 10A to 10D are exploded perspective views of a display apparatus according to an exemplary embodiment of the present disclosure from a front surface.
Figure 10B:
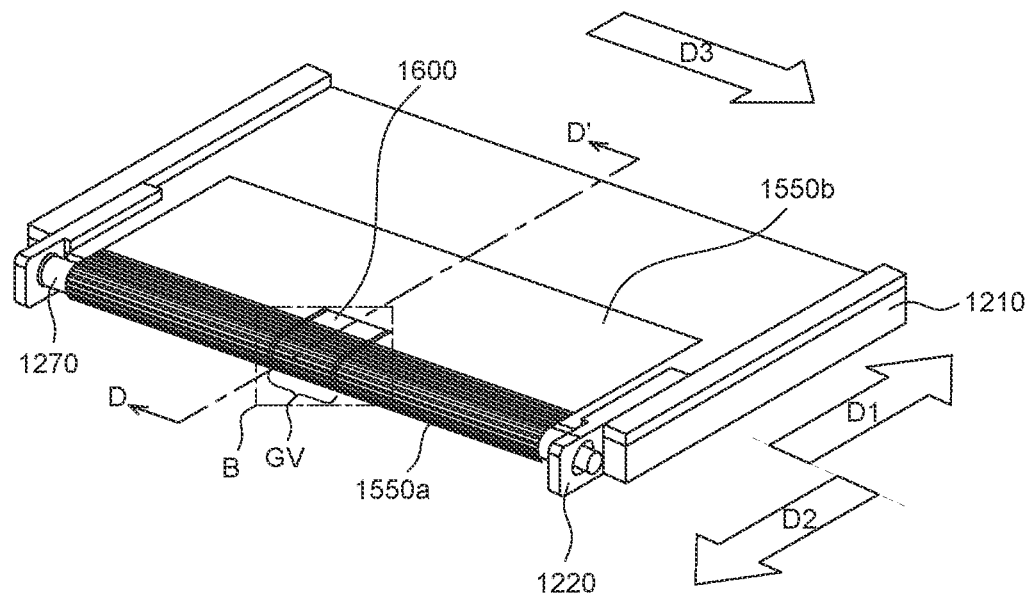
Figure 10C:
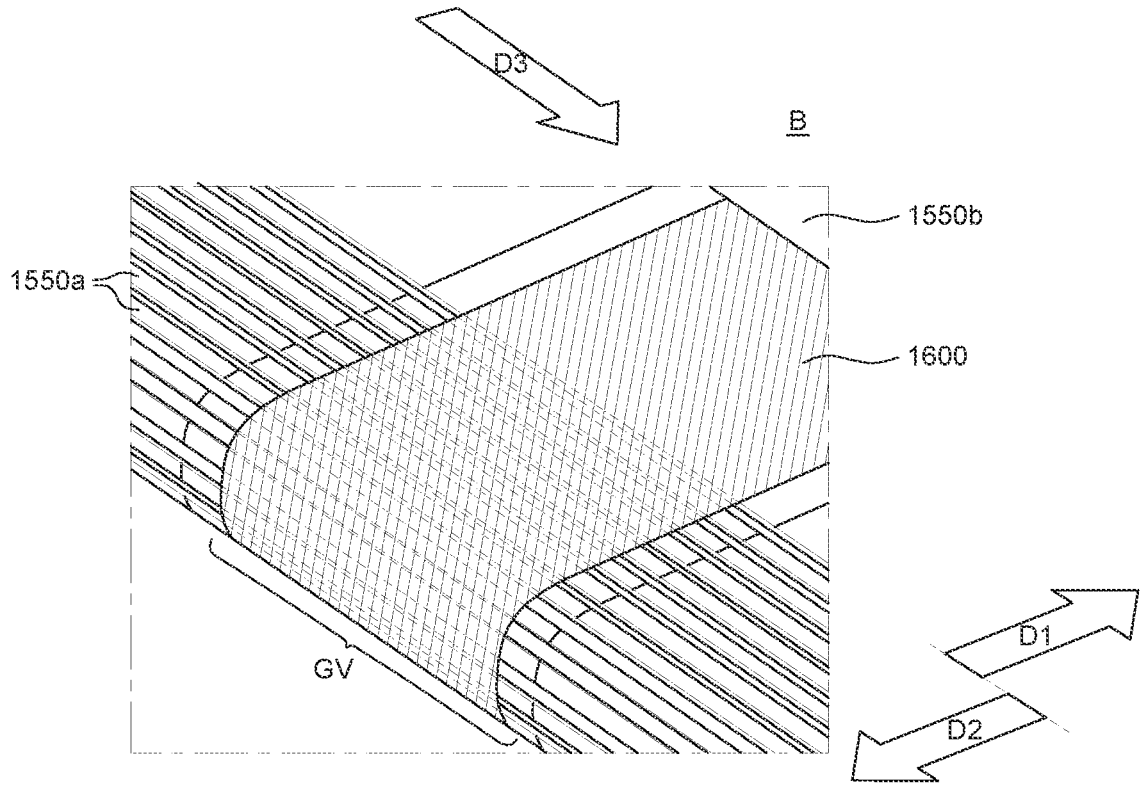
Figure 10D:
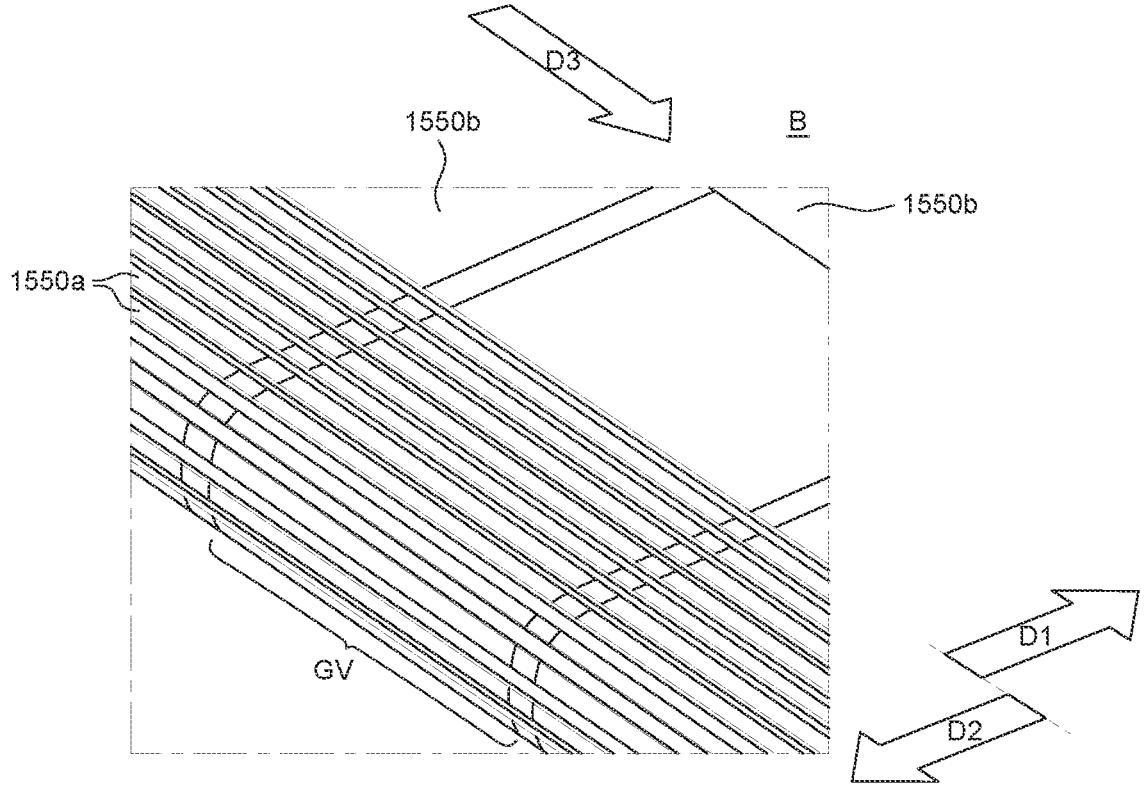

FIGS. 10A to 10D are exploded perspective views of a display apparatus from a front surface according to an exemplary embodiment of the present disclosure. Each of FIGS. 10C and 10D is an enlarged view of the part B of FIG. 10B.

Figure 11A:
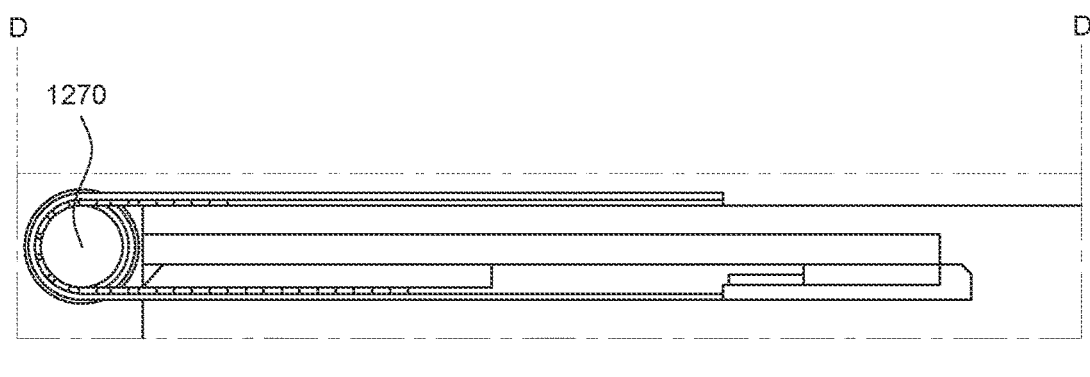
FIG. 11A is a cross-sectional view taken along the line D-D' of FIG. 10B, and FIGS. 11B to 11D show parts of the cross-sectional view taken along the line D-D' of FIG. 10B.
Figure 11A:
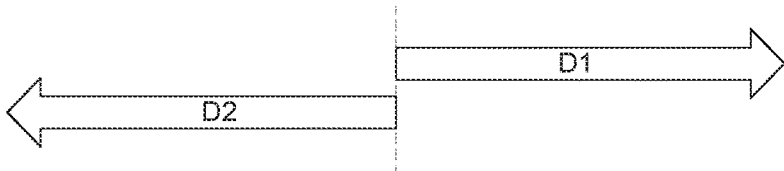

FIG. 11A is a cross-sectional view taken along the line D-D' of FIG. 10B, and FIGS. 11B to 11D show parts of the cross-sectional view taken along the line D-D' of FIG. 10B (e.g., parts of the view of FIG. 11A).

Figure 12A:
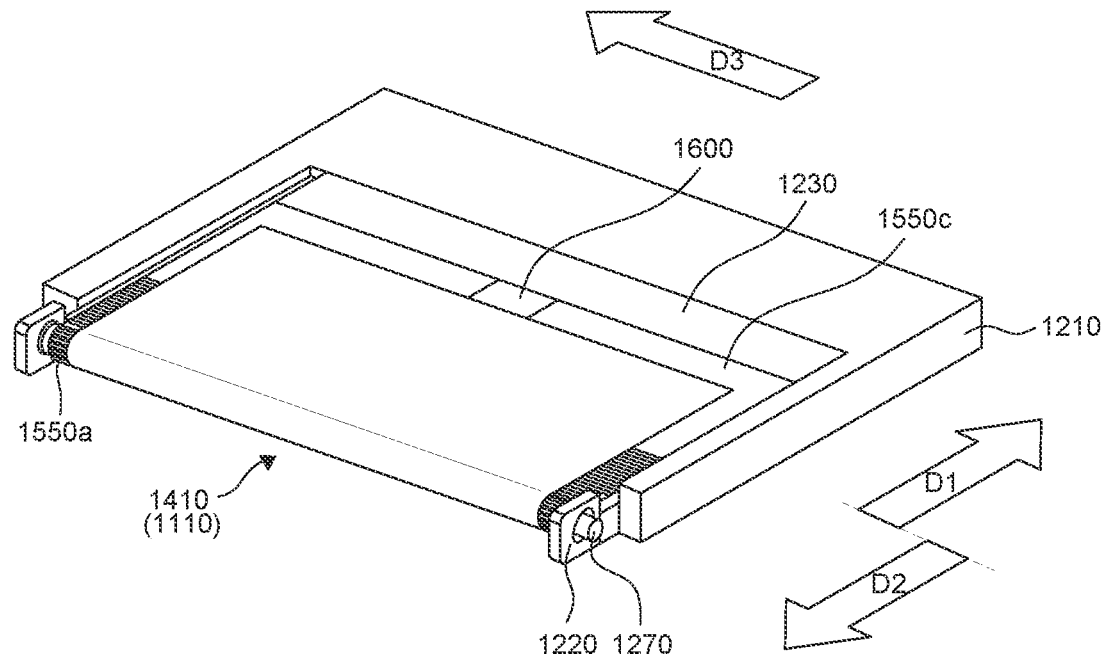
FIGS. 12A to 12C are exploded perspective views of a display apparatus according to an exemplary embodiment of the present disclosure from a rear surface.
Figure 12B:
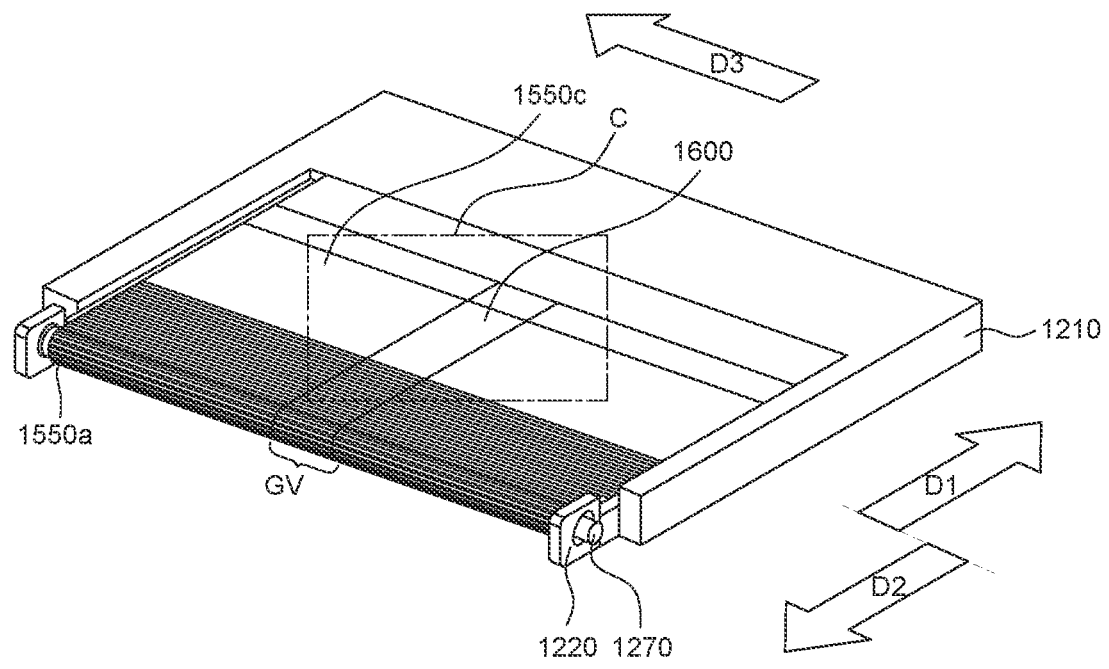
Figure 12C:
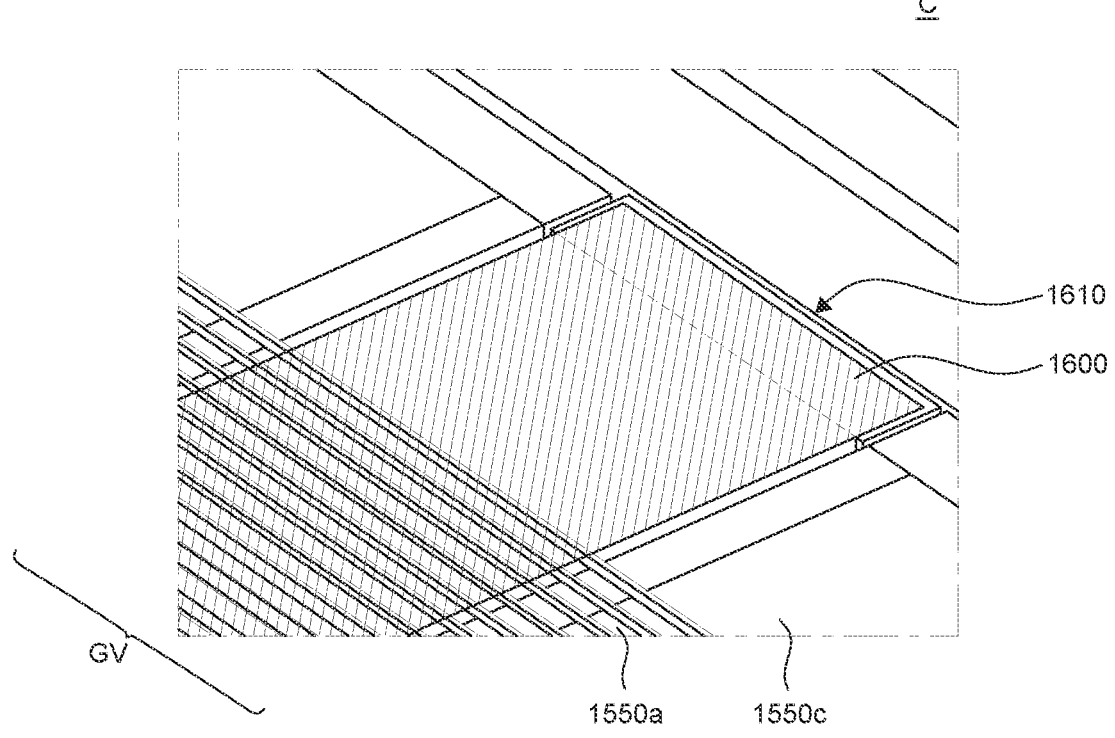

FIGS. 12A to 12C are exploded perspective views of a display apparatus from a rear surface according to an exemplary embodiment of the present disclosure. FIG. 12C is an enlarged view of the part C of FIG. 12B.

Particularly, FIGS. 10A to 10D and FIGS. 12A to 12C are exploded perspective views of a display apparatus 100 in a second state according to an exemplary embodiment of the present disclosure. FIG. 11A is a cross-sectional view taken along the line D-D' of FIG. 10B, and FIGS. 11B to 11D are enlarged views of an upper portion, a side portion, and a lower portion of FIG. 11A, respectively. Description of the components of FIGS. 10A to 12C is substantially the same as the components of FIGS. 2A to 9B so that the description may be omitted or may be simplified.

Referring to FIG. 10A, the display apparatus 100 according to the exemplary embodiment of the present disclosure can include a second frame 1220 including a cylindrical roller 1270, a first frame 1210 which slidably moves in the first direction D1 or the second direction D2, and a flexible display unit 1110 (or a display panel 1410). One side of the flexible display unit is fixed to a part of the first frame 1210 and the other side is fixed to the third frame 1230. FIG. 10A illustrates a second state in which the first frame 1210 moves in the second direction D2 with respect to the second frame 1220 so that an area of the display panel 1410 on the front surface of the display apparatus 100 is reduced.

Referring to FIGS. 10B to 10D, the display apparatus 100 according to the exemplary embodiment of the present disclosure can include a rib portion 1550a and a first flat portion 1550b of the first member 1550 which is disposed on the rear surface of the display panel 1410 to reinforce the rigidity. In order to suppress the loosening or the creases in accordance with the movement of the bending unit of the display panel 1410, a third member 1600 disposed over the rib portion 1550a and the first flat portion 1550b and a groove portion GV configured to accommodate the third member 1600 can be included. Accordingly, a height in the loosened or creased portion of the display panel 1410 can be lowered by the tensile force applied to the both ends (or both sides) of the third member 1600 and a time to recover the original form can be reduced.

Figure 11B:
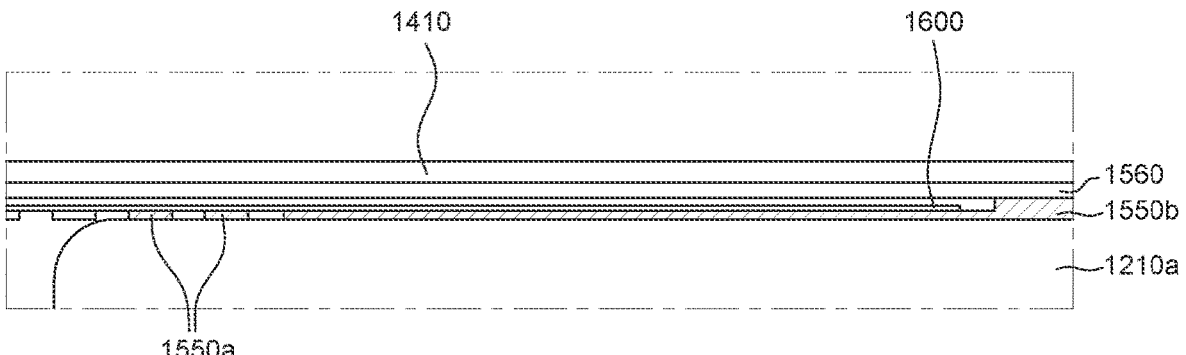

Referring to FIG. 11B which is an enlarged view of an upper portion of FIG. 11A, the third member 1600 can be disposed in the groove portion GV formed over the rib portion 1550*a* and the first flat portion 1550*b* of the first member 1550. The display panel 1410 and the second member 1560 can be disposed on an upper surface of the third member 1600. One side of the third member 1600 can be fixed between the first member 1550 and the second member 1560. The first rear surface portion 1210*b* of the first frame 1210 can be disposed on the lower surface of the first member 1550.

Figure 11C:
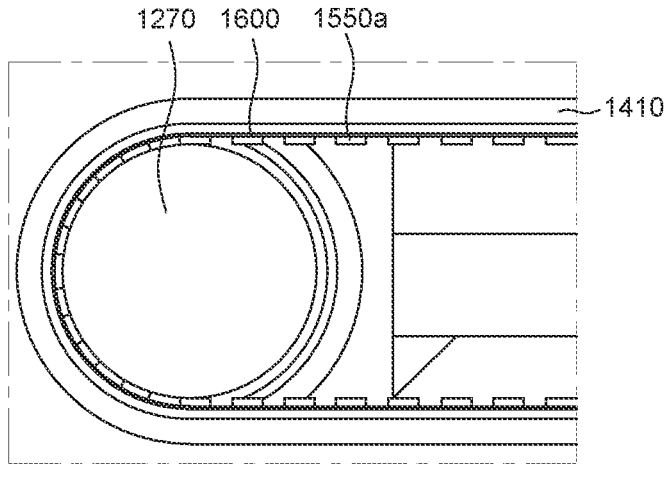

Referring to FIG. 11C which is an enlarged view of a side portion of FIG. 11A, the third member 1600 can be disposed in the groove portion GV formed in the rib portion 1550*a* of the first member 1550. The third member 1600 is bent along the roller 1270 below the rib portion 1550*a* and both ends of the third member 1600 can be disposed in the first direction D1. Both ends (or both sides) of the third member 1600 can be applied with the tensile force in the first direction D1.

Figure 11D:
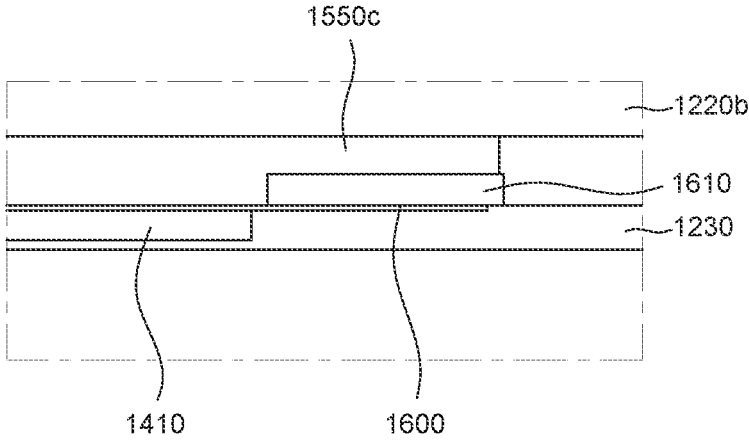

Referring to FIG. 11D which is an enlarged view of a lower portion of FIG. 11A, the third member 1600 can be disposed in the groove portion GV formed in the second flat portion 1550*c* of the first member 1550. The display panel 1410, the second member 1560, and the third frame 1230 can be disposed on an upper surface of the third member 1600. The other side of the third member 1600 can be fixed by the fixing unit 1610 which is configured in the second flat portion 1550*c* of the first member 1550. The third rear surface portion 1220*b* of the second frame 1220 can be disposed on the lower surface of the first member 1550.

Referring to FIG. 12A, the display apparatus 100 according to the exemplary embodiment of the present disclosure can include a second frame 1220 including a cylindrical roller 1270. The display apparatus 100 can include a first frame 1210 which slidably moves in the first direction D1 or the second direction D2 with respect to the second frame 1220 and a flexible display unit 1110 (or a display panel 1410). One side of the flexible display unit is fixed to a part of the first frame 1210 and the other side is fixed to the third frame 1230. FIG. 12A illustrates a second state in which the first frame 1210 moves in the second direction D2 with respect to the second frame 1220 so that an area of the display panel 1410 on the rear surface of the display apparatus 100 is expanded.

Referring to FIGS. 12B and 12C, the display apparatus 100 according to the exemplary embodiment of the present disclosure can include a rib portion 1550*a* and a second flat portion 1550*c* of the first member 1550 which is disposed on the rear surface of the display panel 1410 to reinforce the rigidity. In order to suppress the loosening or the creases in accordance with the movement of the bending unit of the display panel 1410, a third member 1600 disposed over the rib portion 1550*a* and the second flat portion 1550*c*, a groove portion GV which accommodates the third member 1600, and a fixing unit 1610 configured in the second flat portion 1550*c* to fix the other side of the third member 1600 can be included. A height in the loosened or creased portion of the display panel 1410 can be lowered by the tensile force applied to the both ends of the third member 1600, and a time to recover the original form can be reduced.

Figure 13A:
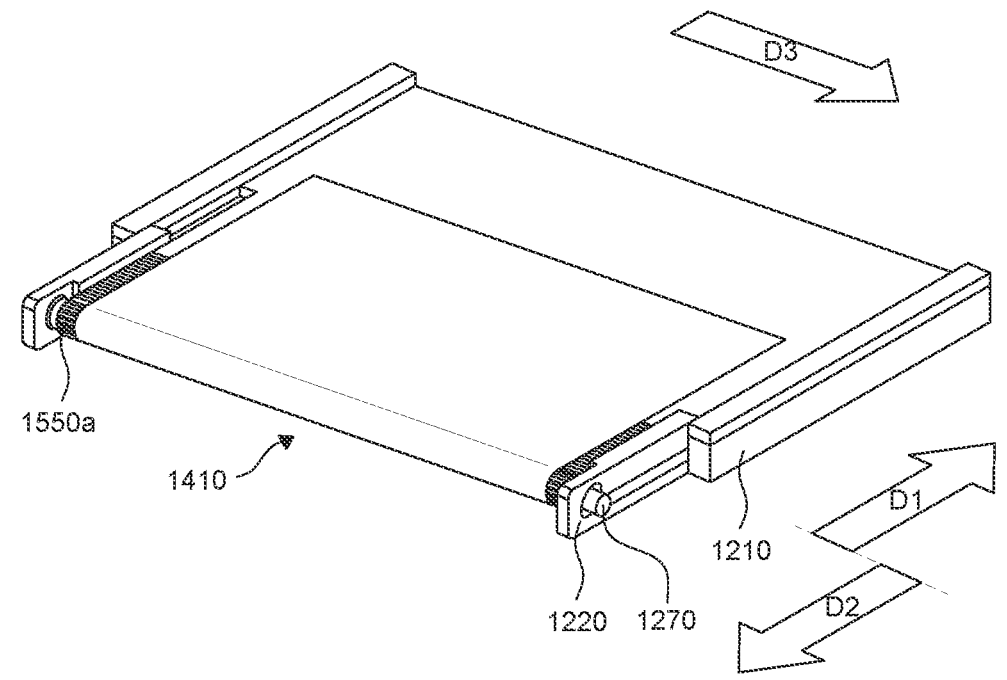
FIGS. 13A to 13C are exploded perspective views of a display apparatus according to an exemplary embodiment of the present disclosure from a front surface.
Figure 13B:
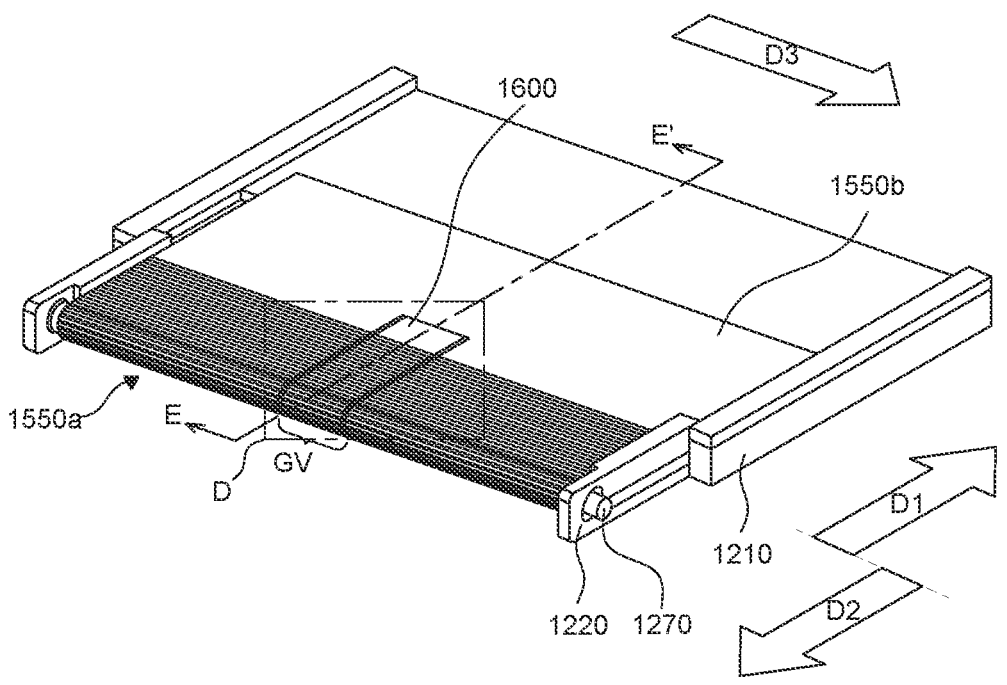
Figure 13C:
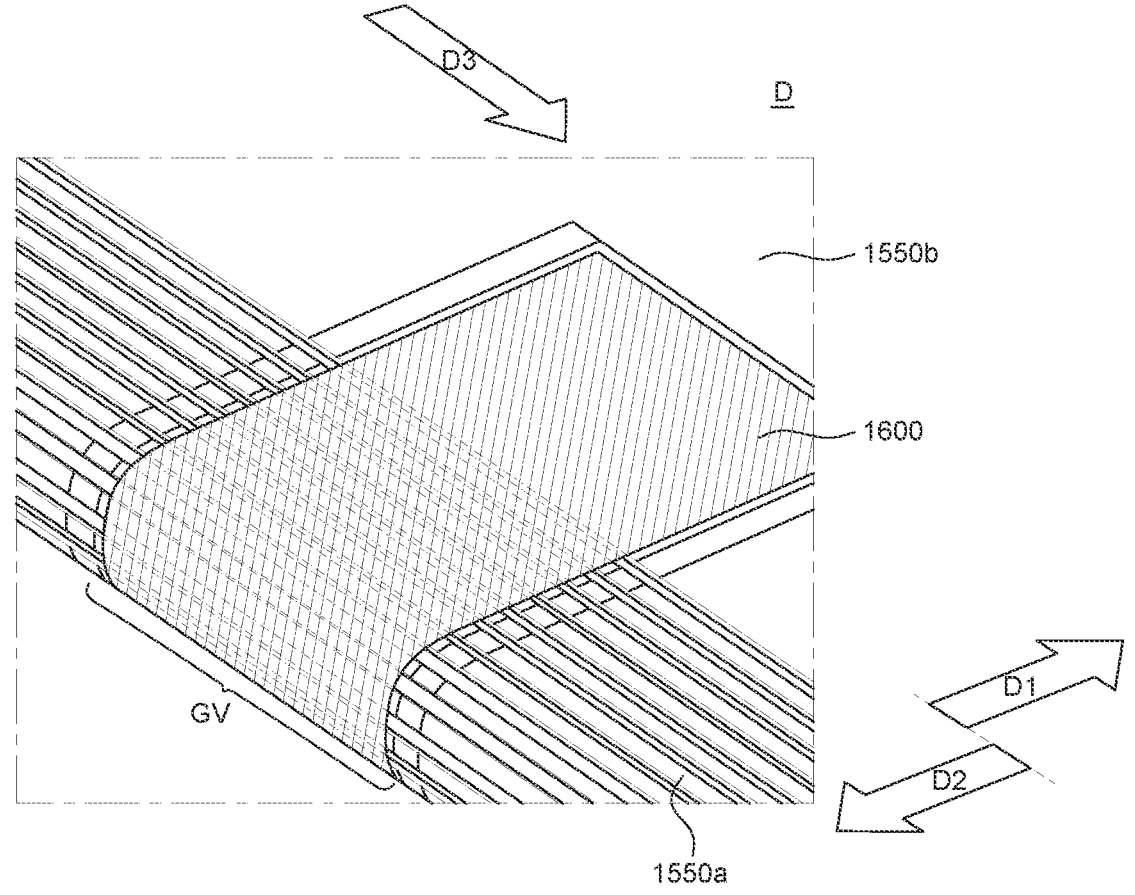

FIGS. 13A to 13C are exploded perspective views of a display apparatus from a front surface according to an exemplary embodiment of the present disclosure. FIG. 13C is an enlarged view of the part D of FIG. 13B.

Figure 14A:
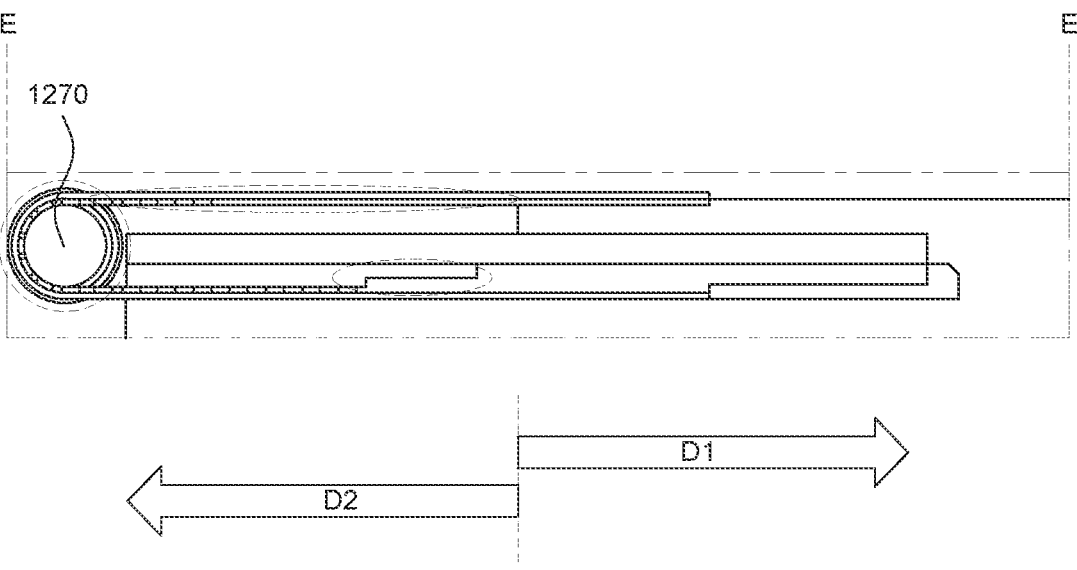
FIG. 14A is a cross-sectional view taken along the line E-E' of FIG. 13B, and FIGS. 14B to 14D show parts of the cross-sectional view taken along the line E-E' of FIG. 13B.

FIG. 14A is a cross-sectional view taken along the line E-E' of FIG. 13B, and FIGS. 14B to 14D show parts of the cross-sectional view taken along the line E-E' of FIG. 13B (e.g., parts of the view of FIG. 14A).

Figure 15A:
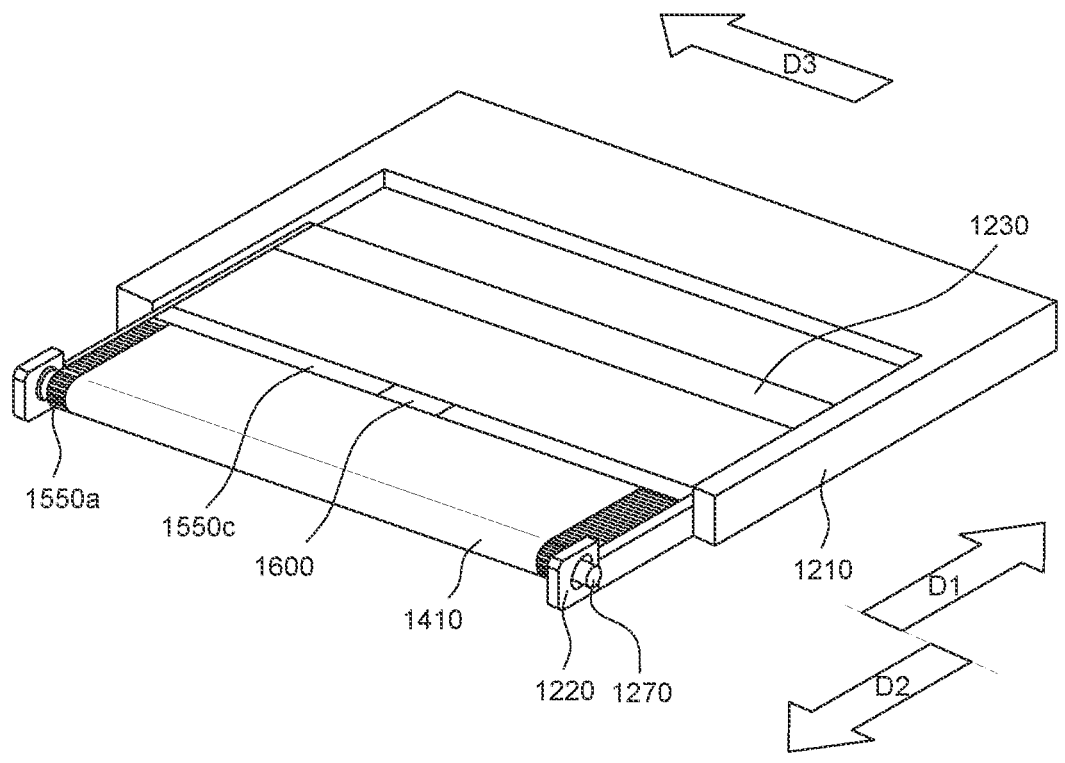
FIGS. 15A to 15C are exploded perspective views of a display apparatus according to an exemplary embodiment of the present disclosure from a rear surface.
Figure 15B:
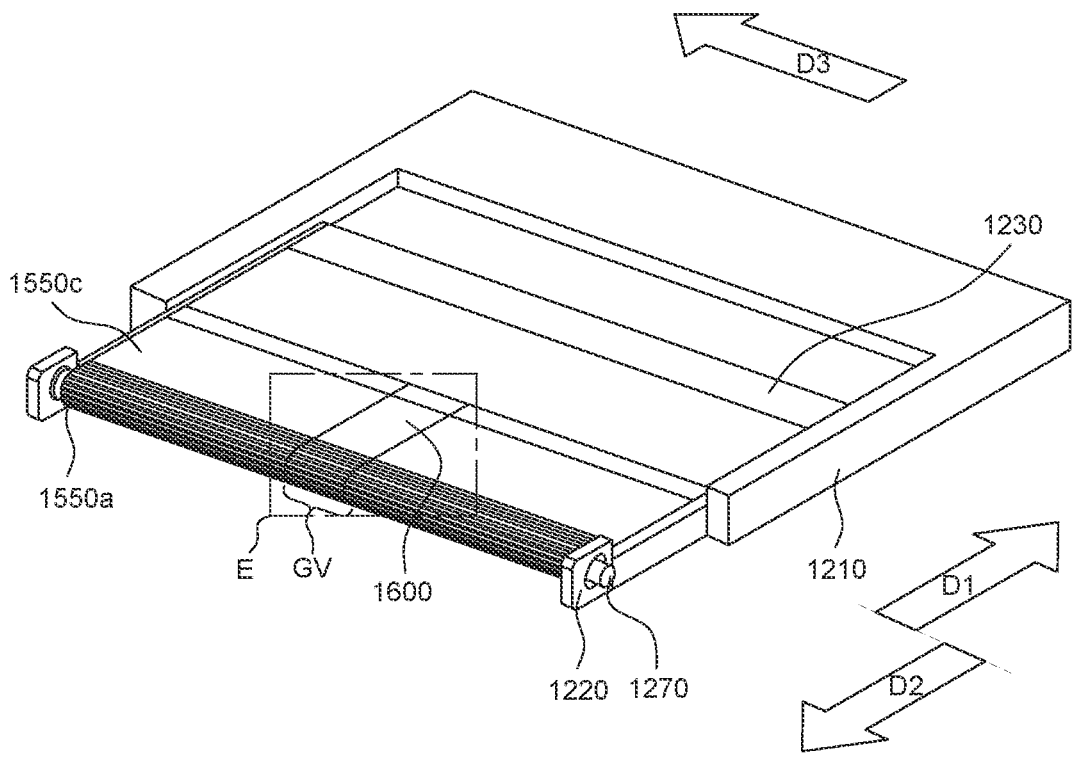
Figure 15C:
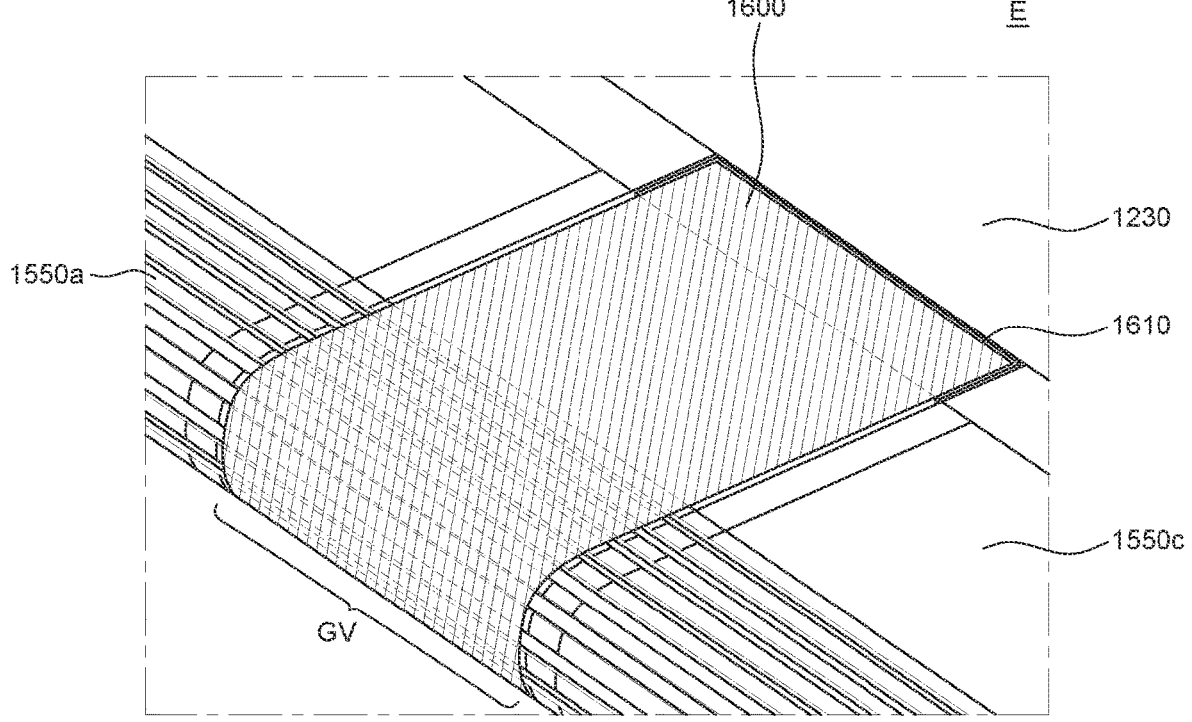

FIGS. 15A to 15C are exploded perspective views of a display apparatus from a rear surface according to an exemplary embodiment of the present disclosure. FIG. 15C is an enlarged view of the part E of FIG. 15B.

Particularly, FIGS. 13A to 13C and FIGS. 15A to 15C are exploded perspective views of a display apparatus 100 in a first state according to an exemplary embodiment of the present disclosure. FIG. 14A is a cross-sectional view taken along the line E-E' of FIG. 13B, and FIGS. 14B to 14D are enlarged views of an upper portion, a side portion, and a lower portion of FIG. 14A, respectively. Description of the components of FIGS. 13A to 15C is substantially the same as the components of FIGS. 2A to 12C so that the description may be omitted or may be simplified.

Referring to FIG. 13A, the display apparatus 100 according to the exemplary embodiment of the present disclosure can include a second frame 1220 including a cylindrical roller 1270. The display apparatus 100 can include a first frame 1210 which slidably moves in the first direction D1 or the second direction D2 with respect to the second frame 1220, and a flexible display unit 1110 (or a display panel 1410). One side of the flexible display unit is fixed to a part of the first frame 1210 and the other side is fixed to the third frame 1230. FIG. 13A illustrates a first state in which the first frame 1210 moves in the first direction D1 with respect to the second frame 1220 so that an area of the display panel 1410 on the front surface of the display apparatus 100 is expanded.

Referring to FIGS. 13B and 13C, the display apparatus 100 according to the exemplary embodiment of the present disclosure can include a rib portion 1550*a* and a first flat portion 1550*b* of the first member 1550 which is disposed on the rear surface of the display panel 1410 to reinforce the rigidity. In order to suppress the loosening or the creases in accordance with the movement of the bending unit of the display panel 1410, a third member 1600 disposed over the rib portion 1550*a* and the first flat portion 1550*b* and a groove portion GV configured to accommodate the third member 1600 can be included. A height in the loosened or creased portion of the display panel 1410 can be lowered by the tensile force applied to both ends (or both sides) of the third member 1600 and a time to recover the original form can be reduced.

Figure 14B:
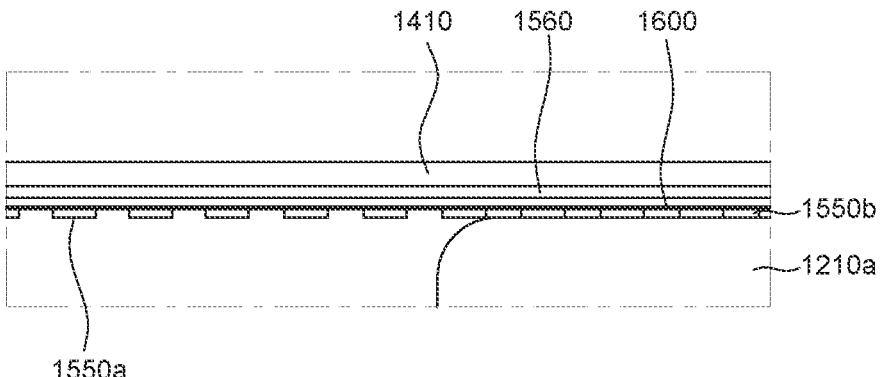

Referring to FIG. 14B which is an enlarged view of an upper portion of FIG. 14A, the third member 1600 can be disposed in the groove portion GV formed over the rib portion 1550*a* and the first flat portion 1550*b* of the first member 1550. The display panel 1410 and the second member 1560 can be disposed on an upper surface of the third member 1600. One side of the third member 1600 can be fixed between the first member 1550 and the second member 1560. The first rear surface portion 1210*b* of the first frame 1210 can be disposed on the lower surface of the first member 1550.

Figure 14C:
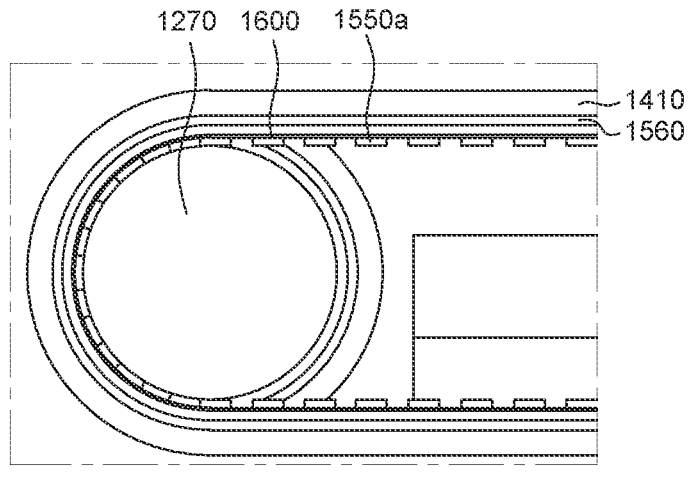

Referring to FIG. 14C which is an enlarged view of a side portion of FIG. 14A, the third member 1600 can be disposed in the groove portion GV formed in the rib portion 1550*a* of the first member 1550. The third member 1600 is bent along the roller 1270 below the rib portion 1550*a*, and both ends of the third member 1600 can be disposed in the first direction D1. Both ends (or both sides) of the third member 1600 can be applied with the tensile force in the first direction D1.

Figure 14D:
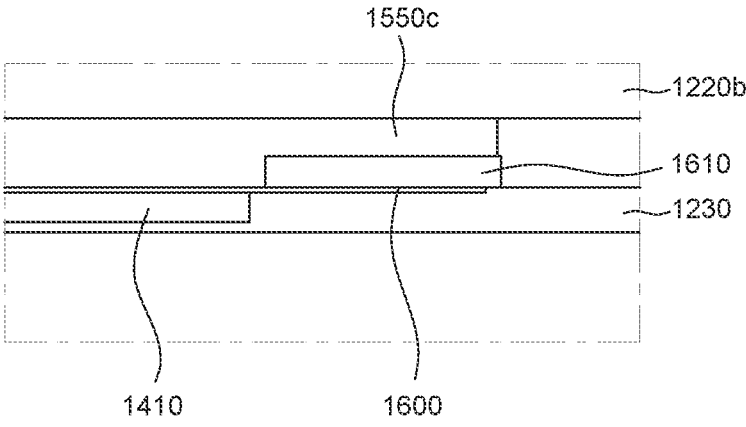

Referring to FIG. 14D which is an enlarged view of a lower portion of FIG. 14A, the third member 1600 can be disposed in the groove portion GV formed in the second flat portion 1550*c* of the first member 1550. The display panel 1410, the second member 1560, and the third frame 1230 can be disposed on an upper surface of the third member 1600. The other side of the third member 1600 can be fixed by the fixing unit 1610 which is configured in the second flat portion 1550c of the first member 1550. The third rear surface portion 1220b of the second frame 1220 can be disposed on the lower surface of the first member 1550.

Referring to FIG. 15A, the display apparatus 100 according to the exemplary embodiment of the present disclosure can include a second frame 1220 including a cylindrical roller 1270. The display apparatus 100 can include a first frame 1210 which slidably moves in the first direction D1 or the second direction D2 with respect to the second frame 1220, and a flexible display unit 1110 (or a display panel 1410). One side of the flexible display unit is fixed to a part of the first frame 1210 and the other side is fixed to the third frame 1230. FIG. 15A illustrates a first state in which the first frame 1210 moves in the first direction D1 with respect to the second frame 1220 so that an area of the display panel 1410 on the rear surface of the display apparatus 100 is reduced.

Referring to FIGS. 15B and 15C, the display apparatus 100 according to the exemplary embodiment of the present disclosure can include a rib portion 1550a and a second flat portion 1550c of the first member 1550 which is disposed on the rear surface of the display panel 1410 to reinforce the rigidity. In order to suppress the loosening or the creases in accordance with the movement of the bending unit of the display panel 1410, a third member 1600 disposed over the rib portion 1550a and the second flat portion 1550c, a groove portion GV which accommodates the third member 1600, and a fixing unit 1610 can be included. The fixing unit 1610 is configured in the second flat portion 1550c to fix the other side of the third member 1600. A height in the loosened or creased portion of the display panel 1410 can be lowered by the tensile force applied to both ends (or both sides) of the third member 1600 and a time to recover the original form can be reduced.

The loosening or creases of the display panel 1410 can affect all the members which are bonded to the display panel 1410 on the rear surface of the display panel 1410. For example, the second member 1560 and the first member 1550 disposed on the rear surface of the display panel 1410 can be also loosened as much as the display panel 1410 is loosened.

For example, the tensile force which acts to maintain the flatness of the third member 1600 acts on the first member 1550, the second member 1560 bonded to the first member 1550, and the display panel 1410 to be parallel. Finally, the loosening and/or creases of the display panel 1410 can be reduced. By doing this, the degradation of the display quality of the display apparatus 100 can be suppressed, and degradation of the touch sense and an operation failure problem at the time of touch input of the display apparatus 100 can be solved.

According to the exemplary embodiment of the present disclosure, when the display apparatus 100 changes from a default state (or a second state) into an expanded state (or a first state), or changes from the expanded state to the default state, the loosening, or creases of the bending unit of the display panel 1410 is relieved. Further, the flexibility and the rigidity of the display panel 1410 can be simultaneously ensured. By doing this, the reliability of the display apparatus 100 can be improved.

The exemplary embodiments of the present disclosure can also be described as follows:

According to an aspect of the present disclosure, a display apparatus includes a first frame, a second frame, and a third frame configuring an outer periphery; and a flexible display unit including a first area coupled to the first frame, a second area coupled to the third frame, and a third area located between the first area and the second area. The flexible display unit includes a display panel, a first member on a rear surface of the display panel; and a second member between the display panel and the first member. The flexible display unit implements a first state by moving the first frame in a first direction with respect to the second frame or implements a second state by moving the first frame in a second direction which is different from the first direction.

The second member can include a 2-1-th member adjacent to the display panel; and a 2-2-th member adjacent to the first member.

The display apparatus can further include a first adhesive layer between the display panel and the 2-1-th member; and a second adhesive layer between the 2-2-th member and the first member.

The first member can include a rib portion in which a plurality of ribs is disposed to be perpendicular to the first direction, and the 2-2-th member can include a pattern unit corresponding to the rib portion of the first member.

The first member can further include a first flat portion at one side of the rib portion; and a second flat portion at the other side of the rib portion.

The first member can further include a groove portion formed in the first direction; and a third member in the groove portion.

The groove portion can be formed over a part of the first flat portion, the entire rib portion, and a part of the second flat portion.

The display apparatus can further include a fixing unit in an overlapping position of the third member and the second flat portion. One side of the third member can be fixed between the first flat portion and the second member, and the other side of the third member can be fixed between the second flat portion and the fixing unit.

The first adhesive layer and the second adhesive layer can be configured by an optically clear adhesive film.

The display apparatus can further include a third adhesive layer between the first member and the second member.

According to another aspect of the present disclosure, a display apparatus includes a display panel displaying an image; a first member on a rear surface of the display panel and having a groove portion in which a top surface partially removed in one direction; a second member between the display panel and the first member; and a third member in the groove portion.

The display apparatus can further include a first adhesive layer between the display panel and the second member; and a second adhesive layer between the second member and the first member.

The second adhesive layer can be not disposed in the groove portion.

The first member can include a rib portion in which a plurality of ribs is disposed in a direction perpendicular to the one direction, other than the groove portion, and the second member can include a pattern unit corresponding to the rib portion of the first member.

The first member can further include a first flat portion disposed at one side of the rib portion; and a second flat portion disposed at the other side different from the one side of the rib portion.

The groove portion can be formed over a part of the first flat portion, the entire rib portion, and a part of the second flat portion.

The display apparatus can further include a fixing unit in an overlapping position of the third member and the second flat portion. One side of the third member can be fixed between the first flat portion and the second member, and the other side of the third member can be fixed between the second flat portion and the fixing unit.

The display panel, the first member, the second member, and the third member can configure a display unit and the display unit can slidably move in the one direction or the other direction through a roller on a side surface.

Although the exemplary embodiments of the present disclosure have been described in detail with reference to the accompanying drawings, the present disclosure is not limited thereto and can be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display apparatus, comprising:
a first frame, a second frame, and a third frame forming an outer periphery; and
a flexible display unit including a first area coupled to the first frame, a second area coupled to the third frame, and a third area located between the first area and the second area,
wherein the flexible display unit includes:
a display panel;
a first member on a rear surface of the display panel, and including a groove portion extending in a first direction;
a second member between the display panel and the first member; and
a third member accommodated in the groove portion, and
wherein the flexible display unit implements a first state by moving the first frame in the first direction with respect to the second frame or implements a second state by moving the first frame in a second direction being different from the first direction,
wherein the first member includes:
a rib portion having a plurality of ribs disposed to be perpendicular to the first direction;
a first flat portion at one side of the rib portion; and
a second flat portion at another side of the rib portion, and
wherein the groove portion is disposed over a part of the first flat portion, the entire rib portion, and a part of the second flat portion.

2. The display apparatus according to claim 1, wherein the second member includes:
a 2-1-th member adjacent to the display panel; and
a 2-2-th member adjacent to the first member.

3. The display apparatus according to claim 2, further comprising:
a first adhesive layer between the display panel and the 2-1-th member; and a second adhesive layer between the 2-2-th member and the first member.

4. The display apparatus according to claim 2, wherein the 2-2-th member includes a pattern unit corresponding to the rib portion of the first member.

5. The display apparatus according to claim 1, wherein the third member is disposed between the first member and the second member.

6. The display apparatus according to claim 1, further comprising:
a fixing unit in an overlapping position of the third member and the second flat portion, wherein
one side of the third member is fixed between the first flat portion and the second member, and
another side of the third member is fixed between the second flat portion and the fixing unit.

7. The display apparatus according to claim 3, wherein each of the first adhesive layer and the second adhesive layer includes an optically clear adhesive film.

8. The display apparatus according to claim 3, further comprising:
a third adhesive layer disposed between the 2-1-th member and the 2-2-th member.

9. The display apparatus according to claim 1, further comprising:
a roller which is disposed at an end portion of the second direction in the second frame and abuts onto an inner surface of the flexible display unit.

10. The display apparatus according to claim 9, wherein the second frame includes a side frame to protect the flexible display unit wound around the roller.

11. The display apparatus according to claim 1, wherein a length of the groove portion is longer than that of the third area and shorter than that of the flexible display unit.

12. The display apparatus according to claim 1, wherein a width of the third member is smaller than a width of the groove portion, and a length of the third member is larger than a length of the groove portion.

13. A display apparatus, comprising:
a display panel configured to display an image;
a first member on a rear surface of the display panel and including a groove portion having a top surface partially removed in one direction;
a second member between the display panel and the first member;
a third member accommodated in the groove portion; and
a fixing unit in an overlapping position of the third member,
wherein the first member includes:
a rib portion having a plurality of ribs disposed in a direction perpendicular to the one direction;
a first flat portion disposed at one side of the rib portion; and
a second flat portion disposed at another side different from the one side of the rib portion, and
wherein one side of the third member is fixed between the first flat portion and the second member, and another side of the third member is fixed between the second flat portion and the fixing unit.

14. The display apparatus according to claim 13, further comprising:
a first adhesive layer between the display panel and the second member; and
a second adhesive layer between the second member and the first member.

15. The display apparatus according to claim 14, wherein the second adhesive layer is not disposed in the groove portion.

16. The display apparatus according to claim 13, wherein the second member includes a pattern unit corresponding to the rib portion of the first member.

17. The display apparatus according to claim 13, wherein the groove portion is disposed over a part of the first flat portion, the entire rib portion, and a part of the second flat portion.

18. The display apparatus according to claim 13, wherein the display panel, the first member, the second member, and the third member constitute a display unit, and wherein the display unit slidably moves in the one direction or another direction through a roller.

19. The display apparatus according to claim 13, wherein a width of the third member is smaller than a width of the groove portion, and a length of the third member is larger than a length of the groove portion.

\* \* \* \* \*